(12) United States Patent
Reznik et al.

(10) Patent No.: US 8,848,640 B2
(45) Date of Patent: Sep. 30, 2014

(54) METHOD AND APPARATUS FOR BANDWIDTH AGGREGATION FOR IP FLOW

(75) Inventors: Alexander Reznik, Titusville, NJ (US); Usman Ehtesham Gul, Waterloo (CA); Michelle Perras, Montreal (CA); Prabhakar R. Chitrapu, Blue Bell, PA (US); John R. Cartmell, Lynbrook, NY (US); John L. Tomici, Southold, NY (US); Hao Jin, Miami, FL (US); Bartosz Balazinski, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 165 days.

(21) Appl. No.: 13/463,611

(22) Filed: May 3, 2012

(65) Prior Publication Data

US 2013/0021968 A1 Jan. 24, 2013

Related U.S. Application Data

(60) Provisional application No. 61/483,425, filed on May 6, 2011, provisional application No. 61/563,326, filed on Nov. 23, 2011, provisional application No. 61/607,175, filed on Mar. 6, 2012.

(51) Int. Cl.
*H04W 4/00* (2009.01)
*H04L 12/709* (2013.01)
*H04W 36/02* (2009.01)
*H04J 3/04* (2006.01)

(52) U.S. Cl.
CPC ........... *H04W 36/026* (2013.01); *H04L 45/245* (2013.01)
USPC .......................................... 370/329; 370/536

(58) Field of Classification Search
CPC combination set(s) only.
See application file for complete search history.

(56) References Cited

U.S. PATENT DOCUMENTS

| | | | | |
|---|---|---|---|---|
| 6,842,446 | B2 * | 1/2005 | Everson et al. | 370/349 |
| 2007/0005787 | A1 * | 1/2007 | Igarashi et al. | 709/230 |
| 2010/0154044 | A1 * | 6/2010 | Manku | 726/7 |
| 2012/0188949 | A1 * | 7/2012 | Salkintzis et al. | 370/329 |

OTHER PUBLICATIONS

Allman et al., "TCP Congestion Control," Network Working Group, Request for Comments: 2581 (Apr. 1999).
Allman et al., "TCP Congestion Control," Network Working Group, Request for Comments: 5681 (Sep. 2009).
Bernardos, "Proxy Mobile IPv6 Extensions to Support Flow Mobility,"draft-ietf-netext-pmipv6-flowmob-02, NETEXT Working Group, Internet-Draft (Oct. 30, 2011).

(Continued)

*Primary Examiner* — Clemence Han
(74) *Attorney, Agent, or Firm* — Condo Roccia Koptiw LLP

(57) ABSTRACT

A method and apparatus for bandwidth aggregation for an Internet protocol (IP) flow are disclosed. A sender may split IP packets on a single IP flow, and transmit the IP packets to a receiver via at least two interfaces. The sender splitting the IP packets over multiple interfaces may not send any signaling to the receiver. Alternatively, the sender may send information to the receiver for configuring distribution of the IP packets over multiple interfaces. The information may be carried on a binding update message, a binding acknowledgement message, or a binding refresh request message. The IP packets may be split and transmitted by a logical interface that sits between an IP layer and a layer 2, or by a bandwidth aggregation (BWA) middleware located between a transmission control protocol (TCP) layer and an IP layer.

24 Claims, 21 Drawing Sheets

(56) References Cited

OTHER PUBLICATIONS

Bernardos, "Proxy Mobile IPv6 Extensions to Support Flow Mobility,"draft-bernardos-netext-pmipv6-flowmob-03, NETEXT Working Group, Internet-Draft (Mar. 14, 2011).

De La Oliva et al., "IP Flow Mobility: Smart Traffic Offload for Future Wireless Networks," Traffic Management for Mobile Broadband Networks, IEEE Communications Magazine (May 2011).

Ford et al., "Architectural Guidelines for Multipath TCP Development," Internet Engineering Task Force (IETF), Request for Comments: 6182 (Mar. 2011).

Gundavelli et al., "Proxy Mobile IPv6," Network Working Group, Request for Comments: 5213 (Aug. 2008).

Hsieh et al., "A Transport Layer Approach for Achieving Aggregate Bandwidths on Multi-Homed Mobile Hosts," The Journal of Mobile Communication, Computation and Information Wireless Networks, vol. 11, No. 2, pp. 99-114 (Jan. 2005).

IEEE Computer Society, "IEEE Standards for Local and metropolitan area networks—Part 21: Media Independent Handover Services," IEEE Std 802.21-2008 (Jan. 21, 2009).

Johnson et al., "Mobility Support in IPv6," Network Working Group, Request for Comments: 3775 (Jun. 2004).

LG Electronics, "Traffic steering across multiple PDN connections over 3GPP access," 3GPP TSG SA WG2 Meeting #81, S2-105026 (Oct. 11-15, 2010).

Mark et al., "A Multipath Flow Routing Approach for Increasing Throughput in the Internet," IEEE Pacific Rim Conference on Communications, Computers and Signal Processing, pp. 21-24 (Aug. 2007).

Melia et al., "Logical Interface Support for multi-mode IP Hosts," draft-ietf-netext-logical-interface-support-02.txt, NETEXT WG, Internet-Draft (Mar. 14, 2011).

Third Generation Partnership Project, "Technical Specification Group Core Network and Terminals; Access Network Discovery and Selection Function (ANDSF) Management Object (MO) (Release 8)," 3GPP TS 24.312 V8.5.0 (Mar. 2010).

Third Generation Partnership Project, "Technical Specification Group Core Network and Terminals; Access Network Discovery and Selection Function (ANDSF) Management Object (MO) (Release 9),"3GPP TS 24.312 V9.1.0 (Mar. 2010).

Third Generation Partnership Project, "Technical Specification Group Core Network and Terminals; Access Network Discovery and Selection Function (ANDSF) Management Object (MO) (Release 9)," 3GPP TS 24.312 V9.2.0 (Sep. 2011).

Third Generation Partnership Project, "Technical Specification Group Core Network and Terminals; Access Network Discovery and Selection Function (ANDSF) Management Object (MO) (Release 10)," 3GPP TS 24.312 V10.2.1 (Apr. 2011).

Third Generation Partnership Project, "Technical Specification Group Core Network and Terminals; Access Network Discovery and Selection Function (ANDSF) Management Object (MO) (Release 10)," 3GPP TS 24.312 V10.5.0 (Mar. 2012).

Third Generation Partnership Project, "Technical Specification Group Core Network and Terminals; Access Network Discovery and Selection Function (ANDSF) Management Object (MO) (Release 11)," 3GPP TS 24.312 V11.2.0 (Mar. 2012).

Third Generation Partnership Project, "Technical Specification Group Services and System Aspects; Data Identification in ANDSF (DIDA); (Release 11)," 3GPP TR 23.8xy V0.1.0 (Apr. 2011).

Third Generation Partnership Project, "Technical Specification Group Services and System Aspects; Data Identification in Access Network Discovery and Selection Function (ANDSF) (DIDA) (Release 11)," 3GPP TR 23.855 V11.0.0 (Dec. 2011).

Third Generation Partnership Project, "Technical Specification Group Services and System and System Aspects; Architecture enhancements for non-3GPP accesses (Release 8)," 3GPP TS 23.402 V8.9.0 (Jun. 2010).

Third Generation Partnership Project, "Technical Specification Group Services and System and Aspects; Architecture enhancements for non-3GPP accesses (Release 8)," 3GPP TS 23.402 V8.10.0 (Mar. 2012).

Third Generation Partnership Project, "Technical Specification Group Services and System Aspects; Architecture enhancements for non-3GPP accesses (Release 9)," 3GPP TS 23.402 V9.8.0 (Mar. 2011).

Third Generation Partnership Project, "Technical Specification Group Services and System Aspects; Architecture enhancements for non-3GPP accesses (Release 9)," 3GPP TS 23.402 V9.12.0 (Mar. 2012).

Third Generation Partnership Project, "Technical Specification Group Services and System Aspects; Architecture enhancements for non-3GPP accesses (Release 10)," 3GPP TS 23.402 V10.3.0 (Mar. 2011).

Third Generation Partnership Project, "Technical Specification Group Services and System Aspects; Architecture enhancements for non-3GPP accesses (Release 10)," 3GPP TS 23.402 V10.7.0 (Mar. 2012).

Third Generation Partnership Project, "Technical Specification Group Services and System Aspects; Architecture enhancements for non-3GPP accesses (Release 11)," 3GPP TS 23.402 V11.2.0 (Mar. 2012).

Third Generation Partnership Project, "Technical Specification Group Core Network and Terminals; Access to the 3GPP Evolved Packet Core (EPC) via non-3GPP access networks; Stage 3 (Release 8)," 3GPP TS 23.302 V8.8.0 (Mar. 2011).

Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.10.0 (Sep. 2011).

Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.5.0 (Mar. 2011).

Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.7.0 (Sep. 2011).

Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.3.1 (Apr. 2011).

Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.7.0 (Mar. 2012).

Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.2.0 (Mar. 2012).

Traw et al., "Striping Within the Network Subsystem," IEEE Network, vol. 9, No. 4, pp. 22-32 (Jul. 1995).

Tsirtsis et al., "Flow Bindings in Mobile IPv6 and Network Mobility (NEMO) Basic Support," Internet Engineering Task Force (IETF), Request for Comments: 6089 (Jan. 2011).

Wakikawa et al., "Multiple Care-of Addresses Registration," Network Working Group, Request for Comments: 5648 (Oct. 2009).

Bernardos, "Proxy Mobile IPv6 Extensions to Support Flow Mobility," draft-ietf-netext-pmipv6-flowmob-02, NETEXT Working Group, Internet-Draft (Oct. 30, 2011).

Bernardos, "Proxy Mobile IPv6 Extensions to Support Flow Mobility," draft-bernardos-netext-pmipv6-flowmob-03, NETEXT Working Group, Internet-Draft (Mar. 14, 2011).

Third Generation Partnership Project, "Technical Specification Group Core Network and Terminals; Access Network Discovery and Selection Function (ANDSF) Management Object (MO) (Release 8),"3GPP TS 24.312 V8.5.0 (Mar. 2010).

Third Generation Partnership Project, "Technical Specification Group Core Network and Terminals; Access Network Discovery and Selection Function (ANDSF) Management Object (MO) (Release 9)," 3GPP TS 24.312 V9.1.0 (Mar. 2010).

(56) References Cited

OTHER PUBLICATIONS

Third Generation Partnership Project, "Technical Specification Group Services and System Aspects; Architecture enhancements for non-3GPP accesses (Release 8)," 3GPP TS 23.402 V8.9.0 (Jun. 2010).

Third Generation Partnership Project, "Technical Specification Group Services and System Aspects; Architecture enhancements for non-3GPP accesses (Release 8)," 3GPP TS 23.402 V8.10.0 (Mar. 2012).

Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.8.0 (Mar. 2011).

Third Generation Partnership Project, "Technical Specification Group Core Network and Terminals; Access to the 3GPP Evolved Packet Core (EPC) via non-3GPP access netwroks; Stage 3 (Release 8)," 3GPP TS 24.302 V8.10.0 (Sep. 2011).

* cited by examiner

1400

| SUB-OPT TYPE | SUB-OPT LEN | BID (1402a) |
|---|---|---|
| PROPORTIONS (1404a) | BID (1402b) | PROPORTIONS (1404b) |

| SEQUENCE NUMBER | | | | |
|---|---|---|---|---|
| I | C | R | RESERVED | LIFETIME |
| MOBILITY OPTIONS | | | | |

FIG. 23A

| SEQUENCE NUMBER | | | | |
|---|---|---|---|---|
| I | C | R | RESERVED | LIFETIME |
| MOBILITY OPTIONS | | | | |
| BANDWIDTH AGGREGATION OPTION (2310) | | | | |

FIG. 23B

| TYPE | | CODE | | CHECKSUM |
|---|---|---|---|---|
| CUR HOP LIMIT | M | O | RESERVED | ROUTER LIFETIME |
| REACHABLE TIME | | | | |
| RETRANSMISSION TIMER | | | | |
| OPTIONS | | | | |

FIG. 24A

| TYPE | | CODE | | CHECKSUM |
|---|---|---|---|---|
| CUR HOP LIMIT | M | O | RESERVED | ROUTER LIFETIME |
| REACHABLE TIME | | | | |
| RETRANSMISSION TIMER | | | | |
| OPTIONS | | | | |
| BANDWIDTH AGGREGATION OPTION (2410) | | | | |

FIG. 24B

METHOD AND APPARATUS FOR BANDWIDTH AGGREGATION FOR IP FLOW

CROSS REFERENCE TO RELATED APPLICATIONS

This application claims the benefit of U.S. provisional application Nos. 61/483,425 filed May 6, 2011, 61/563,326 filed Nov. 23, 2011, and 61/607,175 filed Mar. 6, 2012, the contents of which are hereby incorporated by reference herein.

BACKGROUND

Dual Stack Mobile Internet Protocol (DSMIP) is based on Mobile IP (MIP) protocol that was developed to enable mobility of IP clients between IP subnets (with different address prefixes or IP address pools) without having to change the IP address. In addition to the basic mobility functionality of MIP, DSMIP allows support for IP version 4 (IPv4) and IP version 6 (IPv6) protocol stacks. MIP and DSMIP were standardized in the Third Generation Partnership Project (3GPP) and 3GPP2 for handovers with IP address preservation, that may be referred to as seamless handovers.

Proxy Mobile IPv6 (PMIPv6) is an alternative solution to DSMIP, designed to support IPv6 nodes without any new IP level mobility signaling involvement of the mobile node (MN) by extending, with some modifications, the MIP version 6 (MIPv6) protocol signaling messages between a network node and a home agent (HA), (which in PMIP is referred to as "local mobility anchor" (LMA)). This approach does not require the MN to be involved in the exchange of signaling messages between itself and the HA. In PMIPv6, a proxy mobility agent in the network, (i.e., the mobility access gateway (MAG)), performs the signaling with the LMA and performs the mobility management on behalf of the MN attached to the network.

If the MN simultaneously connects to the PMIPv6 domain through multiple interfaces (and through multiple MAGs), the network allocates a unique set of home network prefixes (HNP) for each of the connected interface. The MN configures addresses on those interfaces from the respective HNP.

If the MN performs a handoff by moving its address configuration from one interface to another, and if the LMA receives a handoff hint from the serving MAG, the LMA may assign the same HNP that it previously assigned prior to the handoff. The MN may perform a handoff by changing its point of attachment from one MAG to another using the same interface and may retain the address configuration on the attached interface.

SUMMARY

A method and apparatus for bandwidth aggregation for an Internet protocol (IP) flow are disclosed. A sender may split IP packets on a single IP flow, and transmit the IP packets to a receiver via at least two interfaces. An anchor node of the IP packets may be located in a mobile core network, at a network edge, in an access network, or in Internet external to a mobile core network.

In one embodiment, the sender splitting the IP packets over multiple interfaces (i.e., multiple links) may not send any signaling to the receiver. Alternatively, the sender may send information to the receiver for configuring distribution of the IP packets over multiple interfaces. The information may be carried on a binding update message, a binding acknowledgement message, or a binding refresh request message.

The IP packets may be split and transmitted by a logical interface that sits between an IP layer and a layer 2. The logical interface may keep track of incoming and outgoing IP packets on all interfaces and select an interface for outgoing IP packets based on a configured rule. The logical interface may use (e.g., mirror) distribution of incoming IP packets over multiple interfaces with or without a weight factor to determine distribution for outgoing IP packets over the interfaces. The logical interface may use a timer to determine whether IP flow mobility or bandwidth aggregation is implemented, wherein the timer is triggered on a condition that an IP packet arrives over a new interface.

The IP packets may be split by a bandwidth aggregation middleware located between a transmission control protocol (TCP) layer and an Internet protocol (IP) layer.

The sender may receive access network discovery and selection function (ANDSF) Inter-System Routing Policy (ISRP) including a routing rule for IP flow distribution and implement the bandwidth aggregation based on the routing rule.

BRIEF DESCRIPTION OF THE DRAWINGS

A more detailed understanding may be had from the following description, given by way of example in conjunction with the accompanying drawings wherein:

FIGS. 23A and 23B show conventional flow mobility initiate (FMI) message format and new FMI message format in accordance with one example embodiment, respectively;

FIGS. 24A and 24B are the conventional router advertisement message and the new router advertisement message including a new option, respectively;

DETAILED DESCRIPTION

Figure 1A:
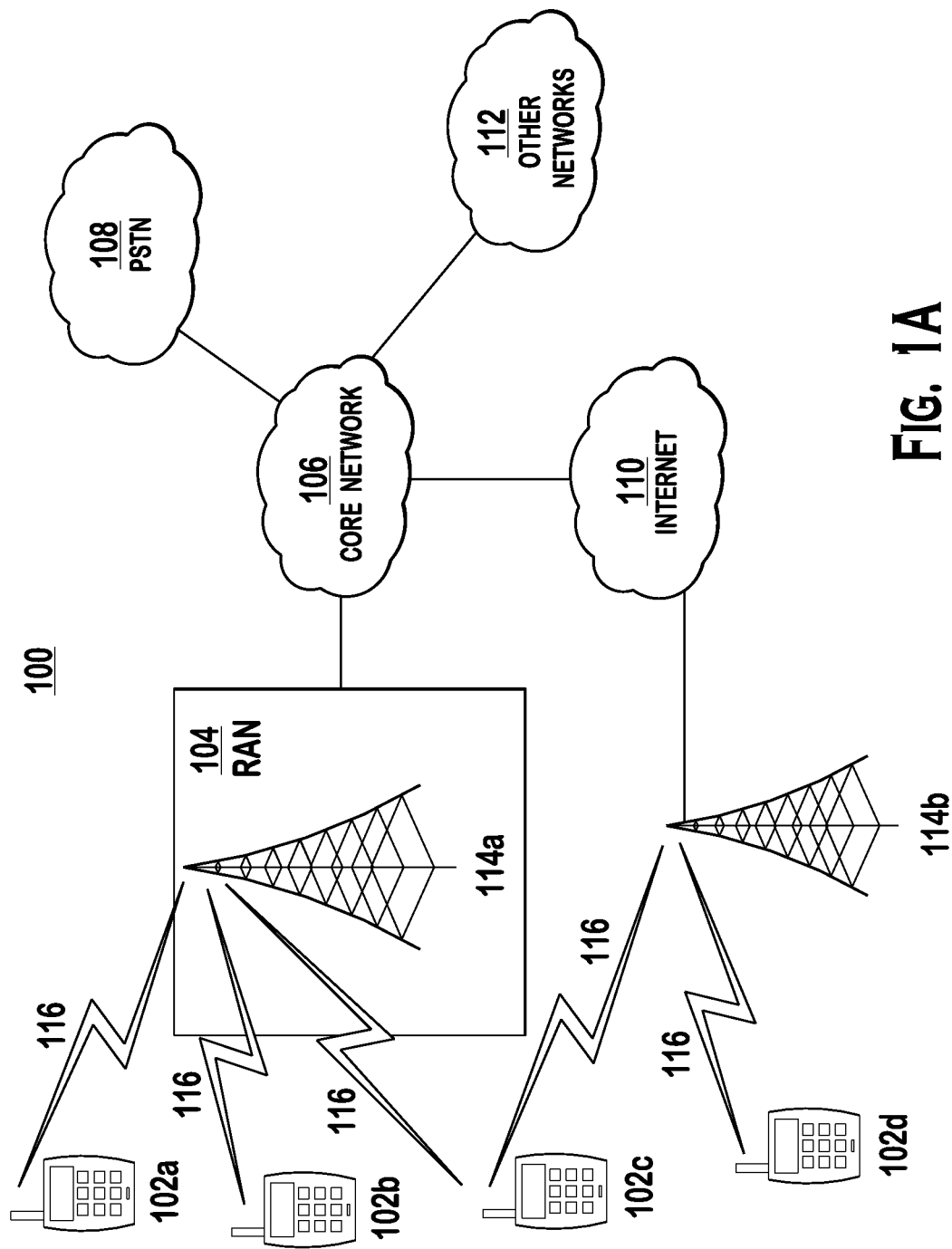
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
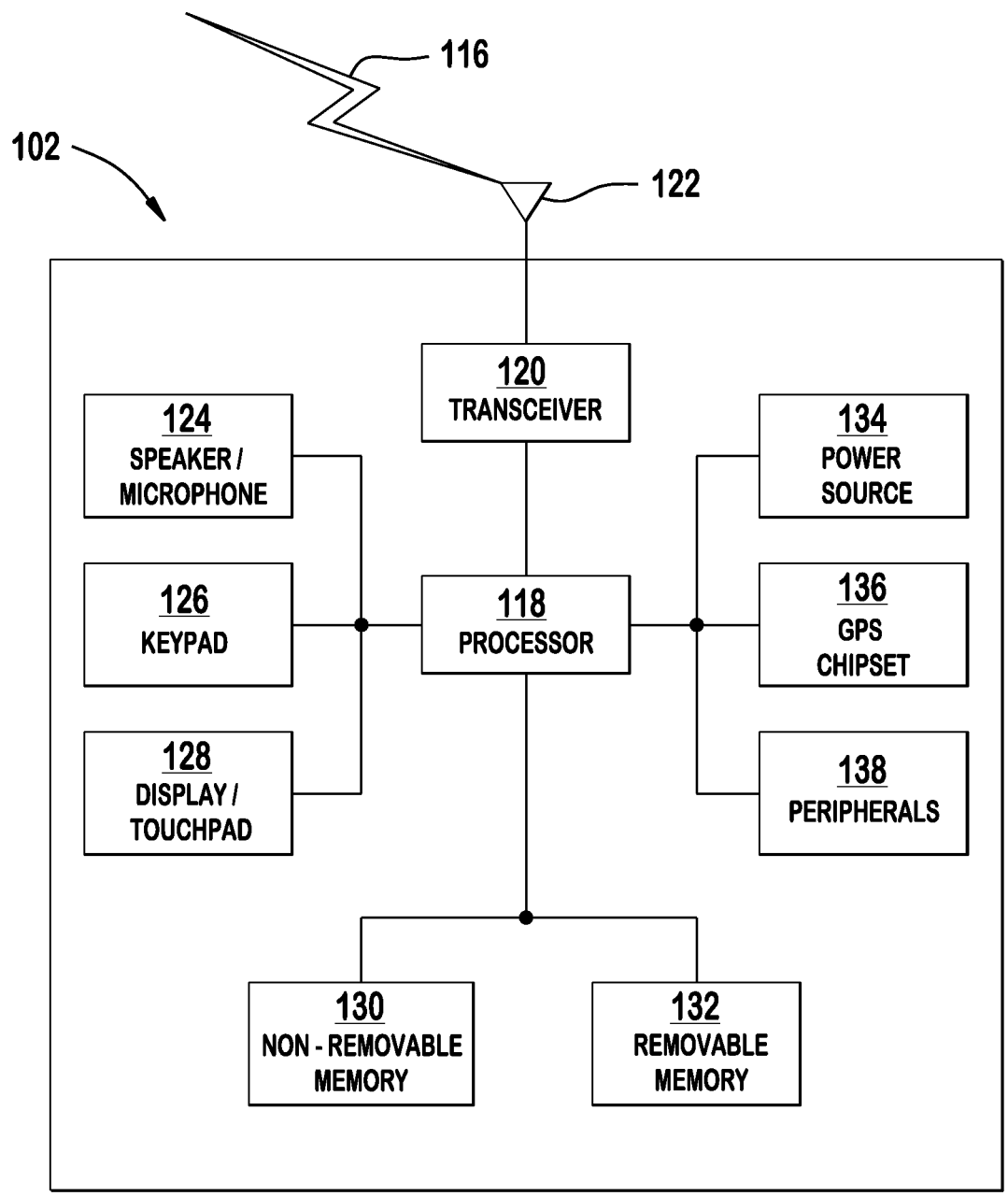
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
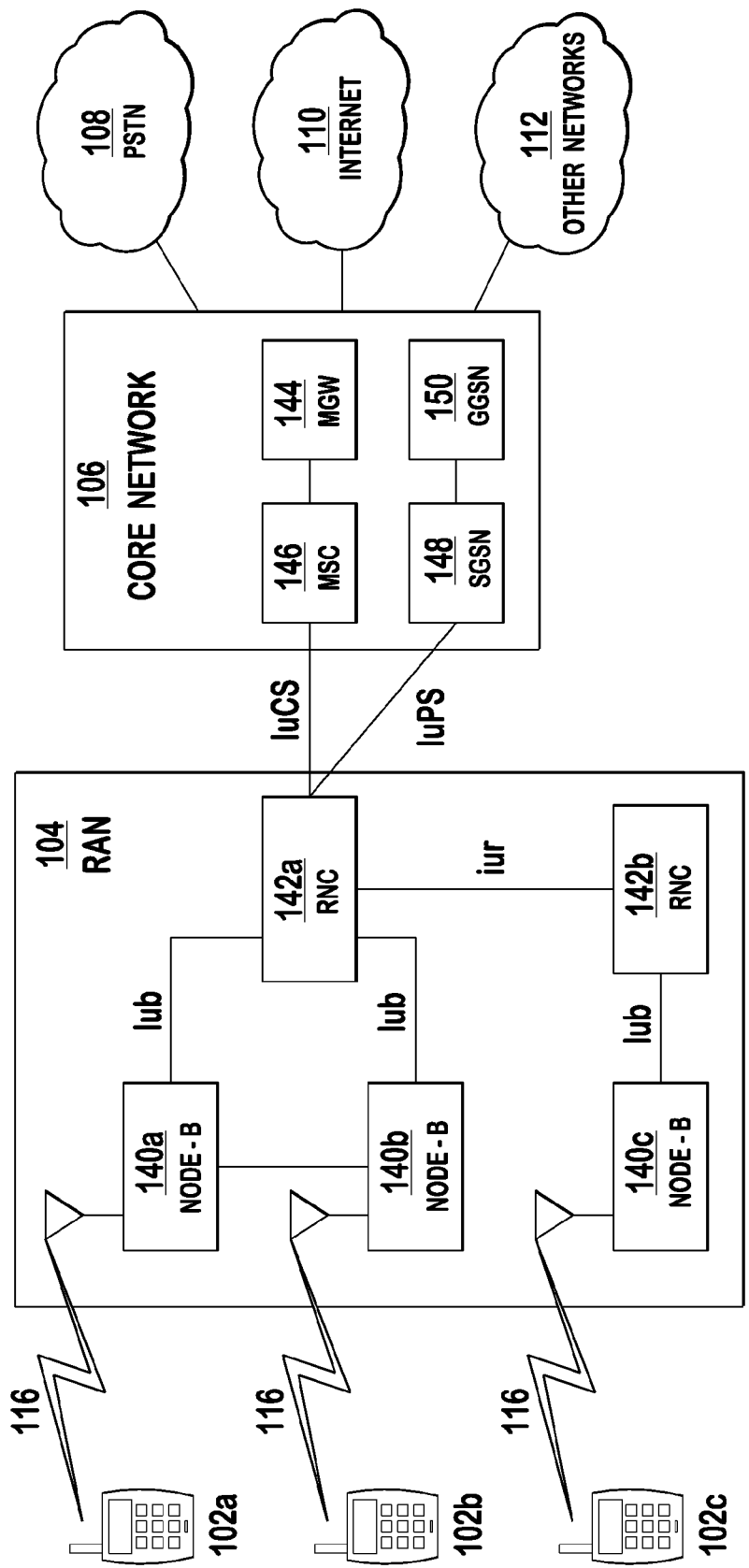
FIG. 1C is a system diagram of an example Universal Mobile Telecommunication System (UMTS) radio access network and an example UMTS core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
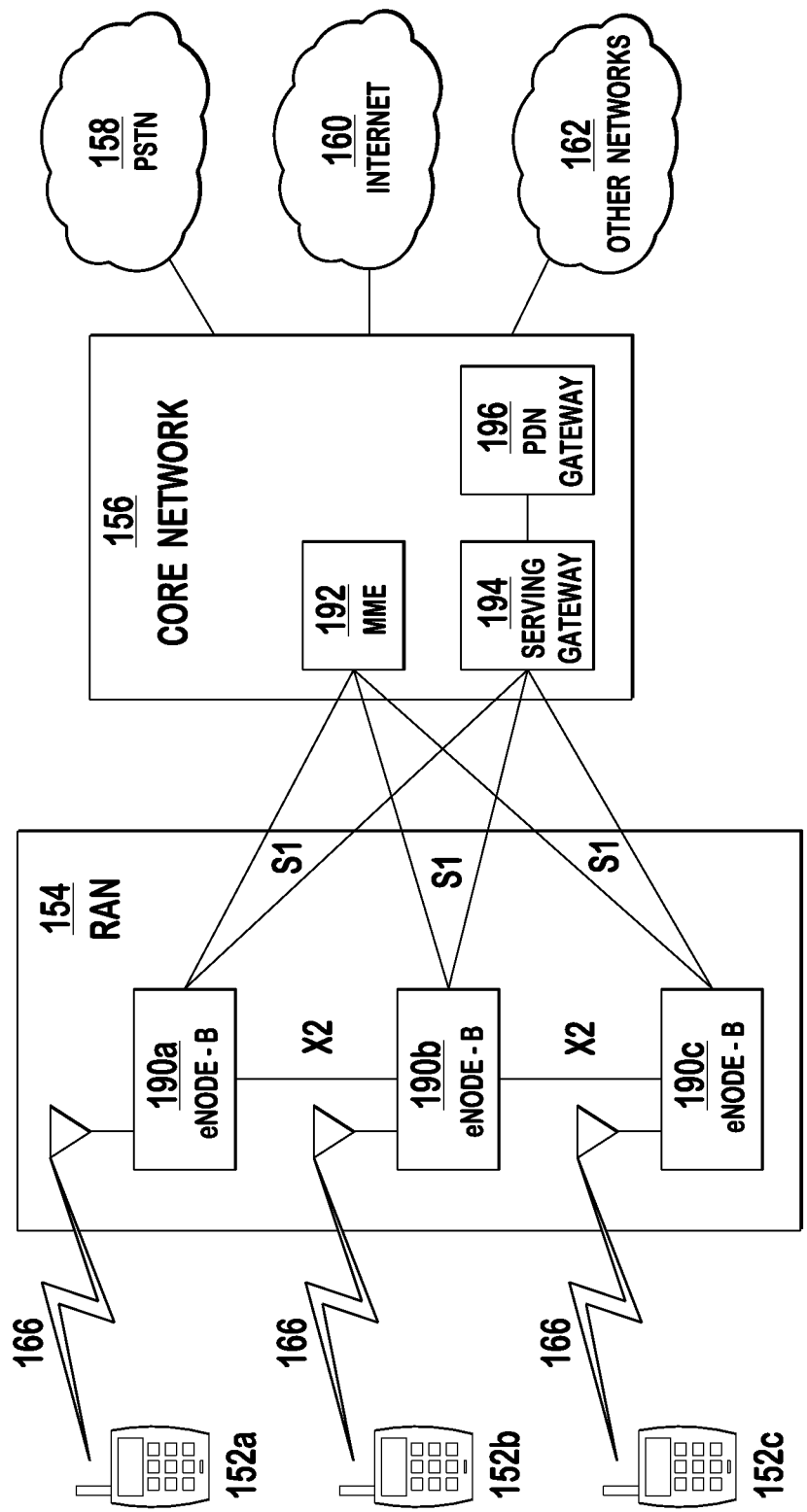
FIG. 1D is a system diagram of an example Long Term Evolution (LTE) radio access network (RAN) and an example LTE core network that may be used within the communications system illustrated in FIG. 1A.

FIG. 1D is a system diagram of an example LTE RAN 154 and an example LTE core network 156 that may be used within the communications system illustrated in FIG. 1A. The RAN 154 employs an E-UTRA radio technology to communicate with the WTRUs 152a, 152b, 152c over the air interface 166. The RAN 154 may also be in communication with the core network 156.

The RAN 154 may include eNode-Bs 190a, 190b, 190c, though it will be appreciated that the RAN 154 may include any number of eNode-Bs while remaining consistent with an embodiment. The eNode-Bs 190a, 190b, 190c may each include one or more transceivers for communicating with the WTRUs 152a, 152b, 152c over the air interface 166. In one embodiment, the eNode-Bs 190a, 190b, 190c may implement MIMO technology. Thus, the eNode-B 190a, for example, may use multiple antennas to transmit wireless signals to, and receive wireless signals from, the WTRU 152a.

Each of the eNode-Bs 190a, 190b, 190c may be associated with a particular cell (not shown) and may be configured to handle radio resource management decisions, handover decisions, scheduling of users in the uplink and/or downlink, and the like. As shown in FIG. 1D, the eNode-Bs 190a, 190b, 190c may communicate with one another over an X2 interface.

The core network 156 shown in FIG. 1D may include a mobility management gateway (MME) 192, a serving gateway 194, and a packet data network (PDN) gateway 196. While each of the foregoing elements are depicted as part of the core network 156, it will be appreciated that any one of these elements may be owned and/or operated by an entity other than the core network operator.

The MME 192 may be connected to each of the eNode-Bs 192a, 192b, 192c in the RAN 154 via an S1 interface and may serve as a control node. For example, the MME 192 may be responsible for authenticating users of the WTRUs 152a, 152b, 152c, bearer activation/deactivation, selecting a particular serving gateway during an initial attach of the WTRUs 152a, 152b, 152c, and the like. The MME 192 may also provide a control plane function for switching between the RAN 154 and other RANs (not shown) that employ other radio technologies, such as GSM or WCDMA.

The serving gateway 194 may be connected to each of the eNode Bs 190a, 190b, 190c in the RAN 154 via the S1 interface. The serving gateway 194 may generally route and forward user data packets to/from the WTRUs 152a, 152b,

152c. The serving gateway 194 may also perform other functions, such as anchoring user planes during inter-eNode B handovers, triggering paging when downlink data is available for the WTRUs 152a, 152b, 152c, managing and storing contexts of the WTRUs 152a, 152b, 152c, and the like.

The serving gateway 194 may also be connected to the PDN gateway 196, which may provide the WTRUs 152a, 152b, 152c with access to packet-switched networks, such as the Internet 160, to facilitate communications between the WTRUs 152a, 152b, 152c and IP-enabled devices.

The core network 156 may facilitate communications with other networks. For example, the core network 156 may provide the WTRUs 152a, 152b, 152c with access to circuit-switched networks, such as the PSTN 158, to facilitate communications between the WTRUs 152a, 152b, 152c and traditional land-line communications devices. For example, the core network 156 may include, or may communicate with, an IP gateway (e.g., an IP multimedia subsystem (IMS) server) that serves as an interface between the core network 156 and the PSTN 158. In addition, the core network 156 may provide the WTRUs 152a, 152b, 152c with access to the networks 162, which may include other wired or wireless networks that are owned and/or operated by other service providers.

Bandwidth aggregation is a scheme for combining multiple interfaces to increase the total available bandwidth and improve reliability with link redundancy. With bandwidth aggregation, an IP flow may be split and transported between a mobile node and an anchor node, (e.g., a local mobility anchor (LMA), a converged gateway (CGW), or the like), over multiple links or interfaces. The individual links may be of the same or different radio access technologies. Bandwidth aggregation may be handled at various protocol layers, (e.g., IP layer) between the mobile node and the anchor node.

Hereafter, the terms "bandwidth aggregation," "IP flow aggregation," and "IP flow splitting" will be used interchangeably. Hereafter, the terms "WTRU" and "mobile node" (MN) will be used interchangeably.

Based on rules, policies, link conditions, or the like, the anchor node in the network may decide to forward downlink (DL) packets associated to a single IP flow via two or more links or interfaces (e.g., via a cellular network and a WLAN). Likewise, in the uplink direction, the MN (e.g., a WTRU) may send IP packets on a single flow to the anchor node using two or more links or interfaces. The bandwidth aggregation in the uplink may be configured and controlled by the anchor node. The MN may also configure the bandwidth aggregation for the downlink.

Figure 2:
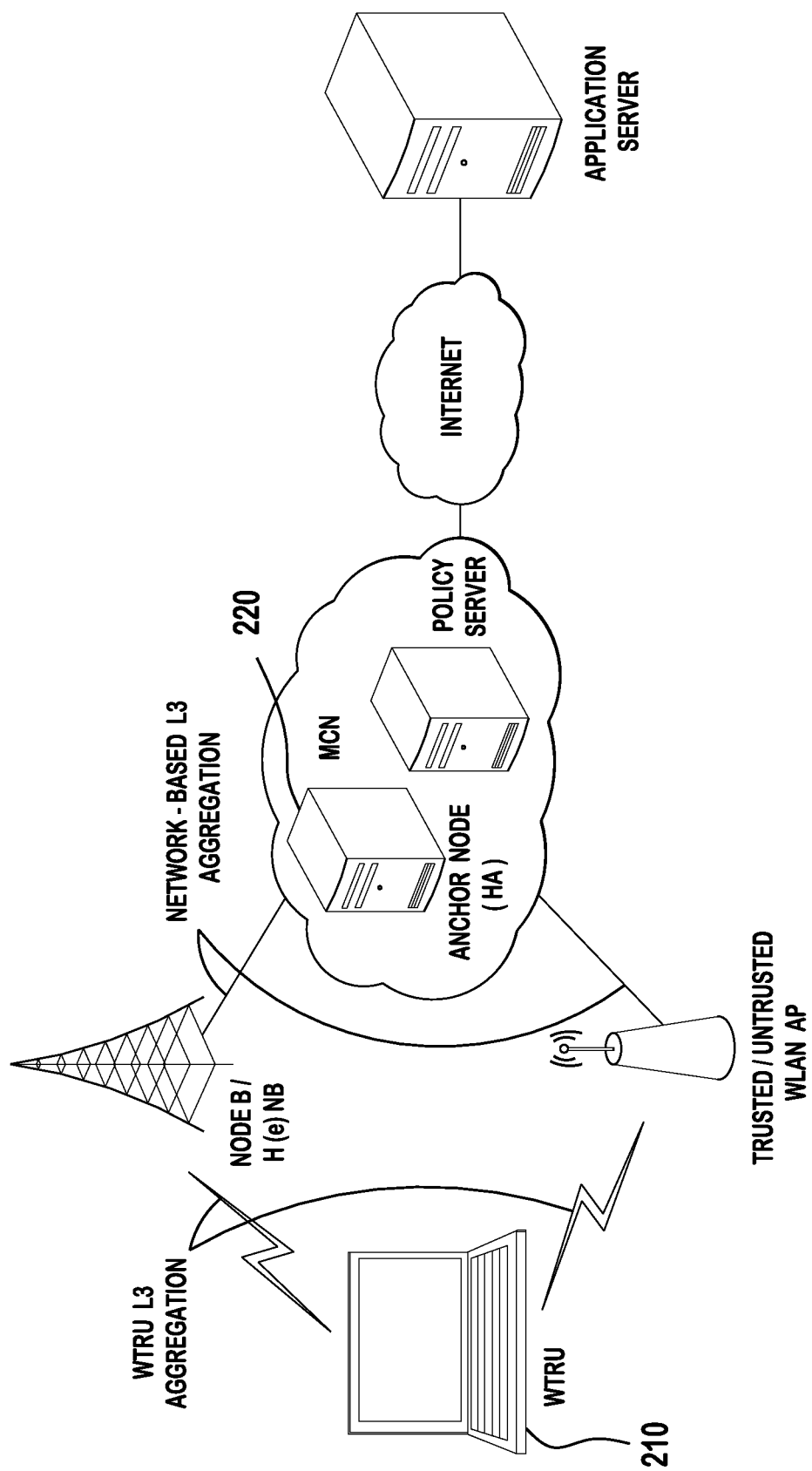
FIGS. 2-4 show an example architecture for the support of bandwidth aggregation at the WTRU and the anchor node.
Figure 3:
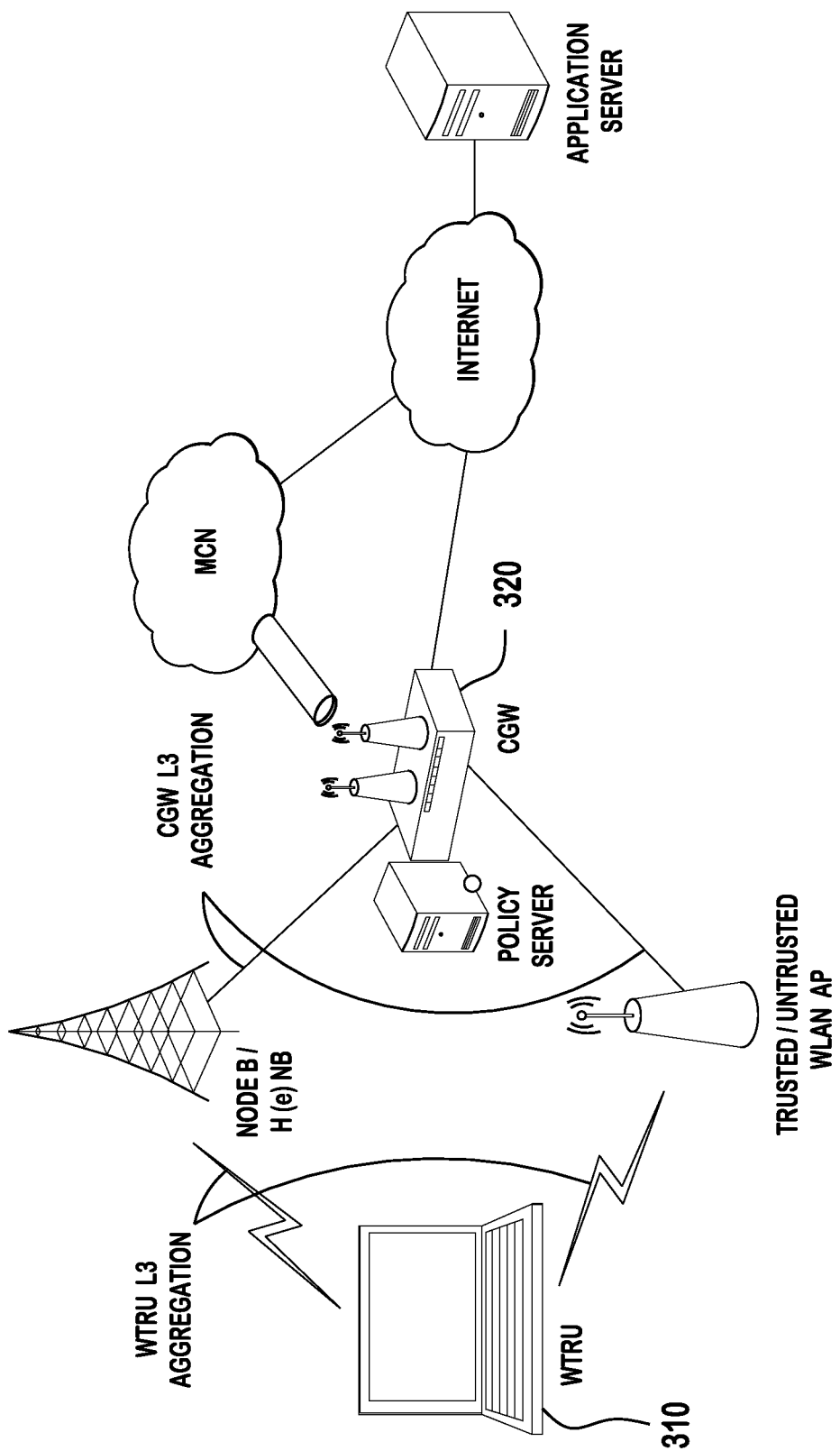
Figure 4:
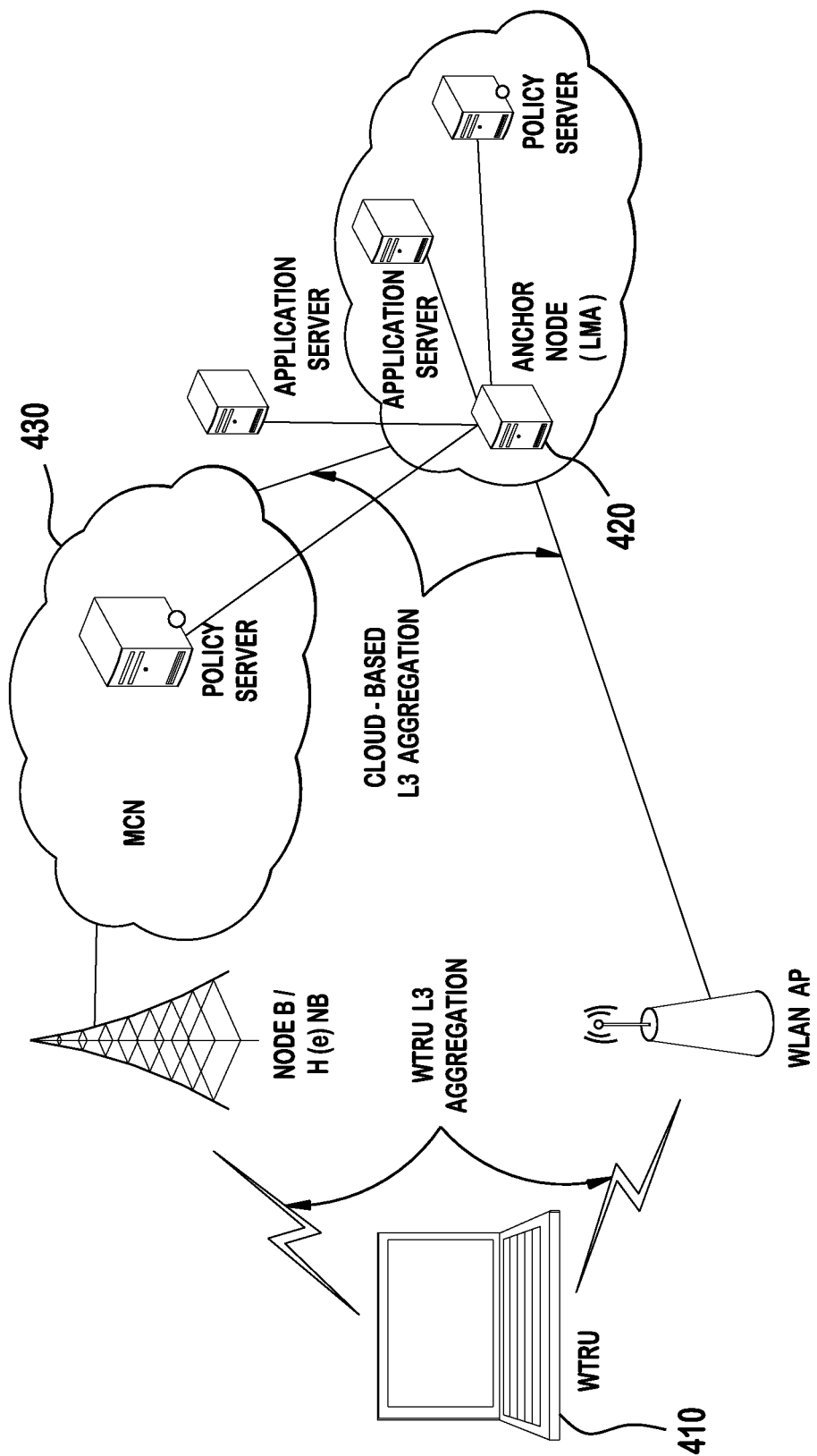

FIGS. 2-4 show an example architecture for the support of bandwidth aggregation at the WTRU and the anchor node. FIG. 2 shows that the WTRU 210 and the anchor node 220 may transport packets of the same IP flow over the macro wireless network and the WLAN. FIG. 3 shows another example architecture for the support of bandwidth aggregation at the WTRU 310 and the converged gateway (CGW) 320 (i.e., anchor node) in a small cell deployment. FIG. 4 shows another example architecture for the support of bandwidth aggregation at the WTRU 410 and the anchor node 420, wherein the anchor node 420 is located outside the mobile core network 430.

In the following descriptions, the 3GPP network architecture will be used as a representative example for implementing the bandwidth aggregation. However, it should be noted that the embodiments disclosed herein may be implemented in any other network architecture. For example, the policy server that provides the operator policy-based bandwidth aggregation control may be placed in a number of locations and may be located within or outside the mobile core network. The anchor node and the policy server may be placed at the network edge or in the access network. The anchor node and the policy server may be located in the Internet external to the mobile core network, with the application server either within the same network or in a different network. The policy server may be either within the same cloud, or located in the operator's network.

The bandwidth aggregation may be implemented by modifying the DSMIP messages and procedures to enable IP flow splitting and aggregation. Alternatively, PMIP messages and procedures may be modified to implement the bandwidth aggregation. Alternatively, a middleware function that sits below the TCP layer may be introduced to perform buffering, reordering, and ACK spoofing, or the like, wherein such functions improve the performance of the TCP layer when two or more radio links are different in their transport characteristics, such as latency. Embodiments for the above solutions are disclosed hereafter.

Figure 5:
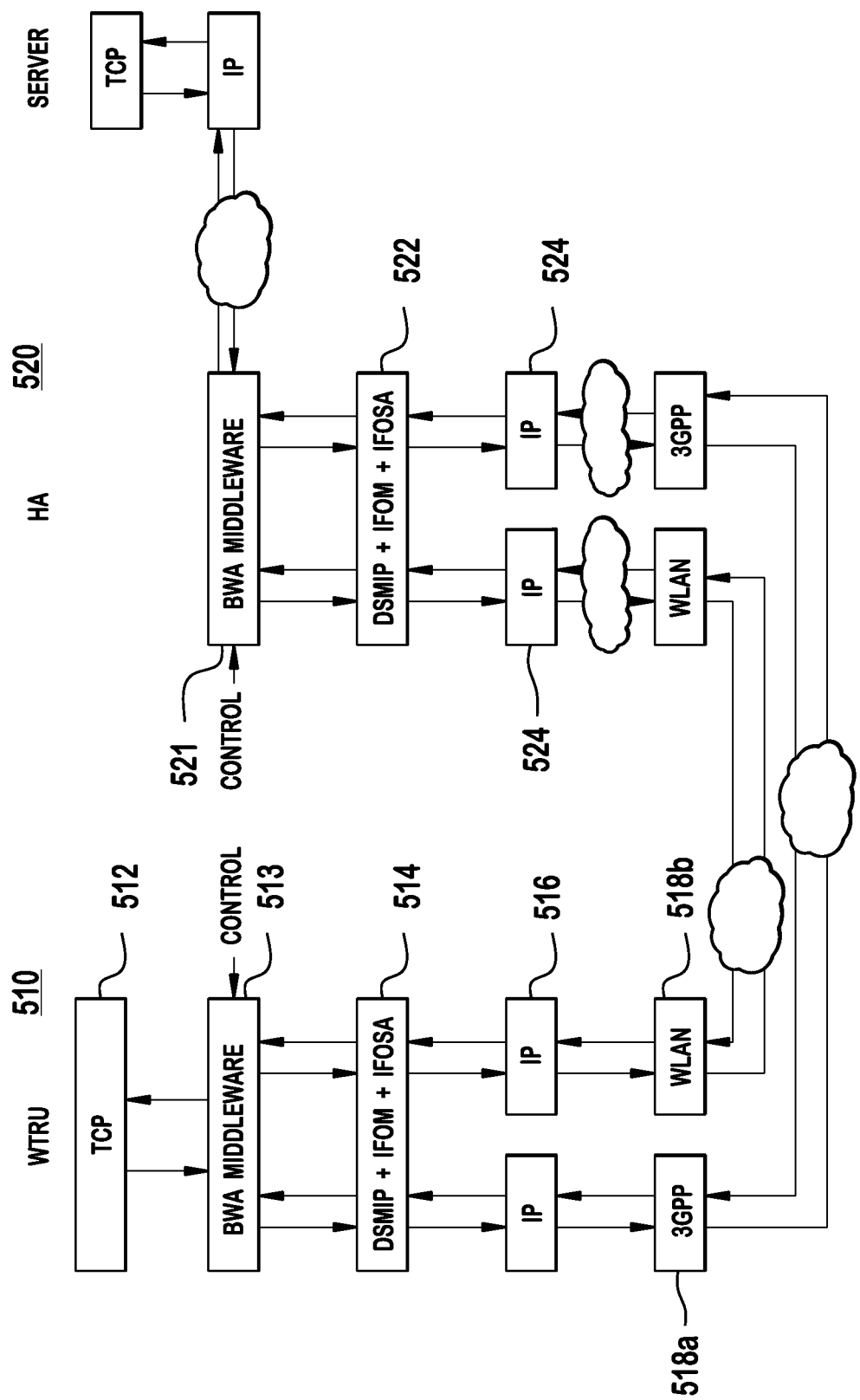
FIG. 5 shows the protocol stack for Dual Stack Mobile Internet Protocol (DSMIP)-based bandwidth aggregation.

Embodiments for implementing bandwidth aggregation using DSMIP are disclosed hereafter. FIG. 5 shows the protocol stack for DSMIP-based bandwidth aggregation. A WTRU 510 includes a TCP layer 512, a BWA middleware 513, a DSMIP layer 514, an IP layer 516, and multiple lower layers 518a, 518b specific to radio access technologies. An HA 520 includes a BWA middleware 521, a DSMIP layer 522, and an IP layer 524. In accordance with one embodiment, the DSMIP layer 512, 522 at the WTRU 510 and the HA 520 is enhanced to include IP flow splitting and aggregation (IFOSA) for associating one IP flow with two or more interfaces. DSMIP is based on MIP protocol that was developed to enable mobility of IP clients between IP subnets (with different address prefixes or IP address pools) without having to change the IP address. In addition to the basic mobility functionality of MIP, DSMIP allows support for IP version 4 (IPv4) and IP version 6 (IPv6) protocol stacks. DSMIP supports multi-homing (i.e., supporting multiple care-of-addresses (CoAs) at the same time) and also supports binding and moving IP flows from one radio link to another (i.e., IP flow mobility (IFOM)). IFOM refers to the movement of selected IP flow(s) from one access technology to another in its entirety. A specific IP flow that exists on a specific interface can be moved to another interface, while the remaining flows continue to be sent using the original interface.

Figure 6:
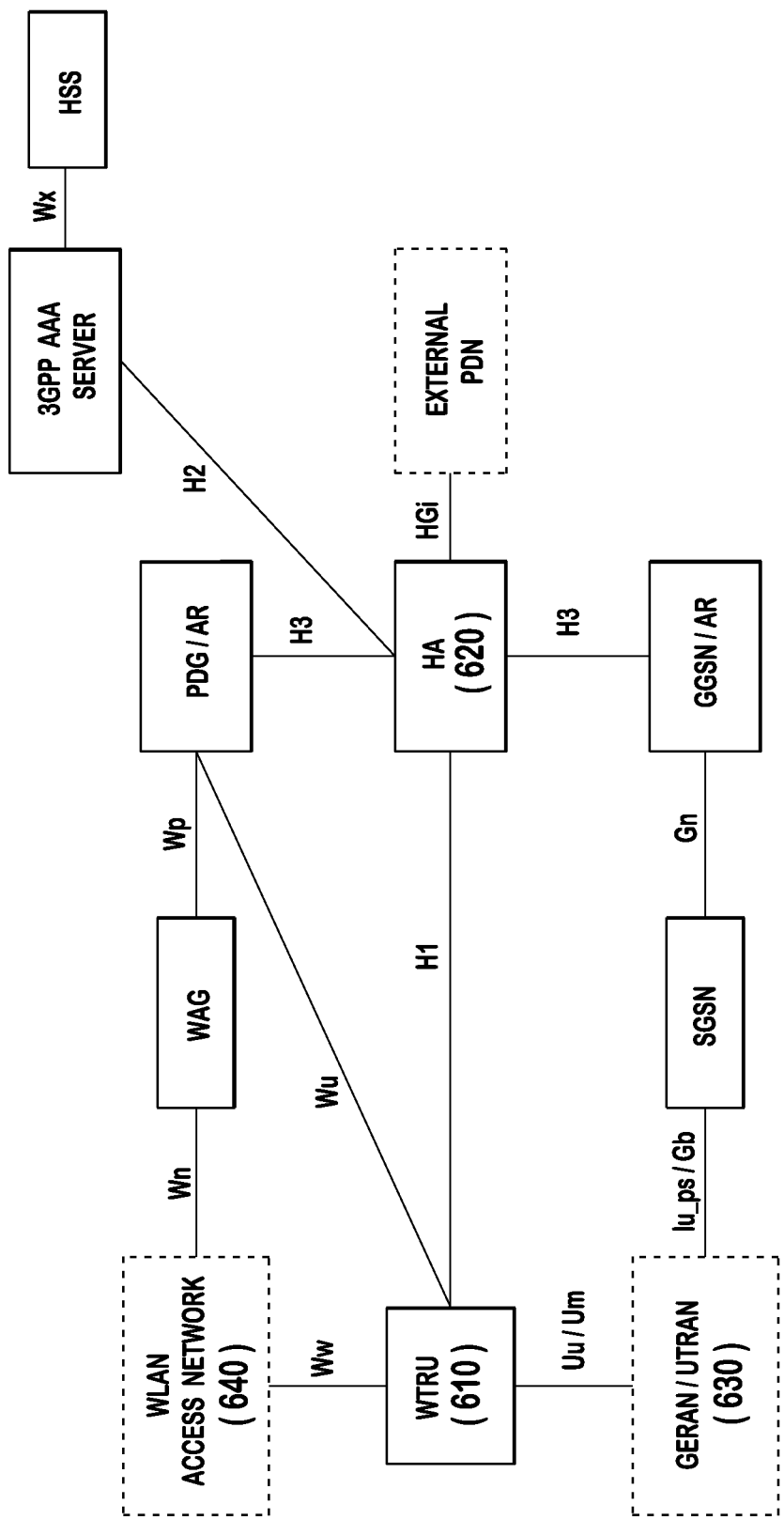
FIG. 6 shows an example architecture where a DSMIP-based IP flow management and bandwidth aggregation may be implemented.

FIG. 6 shows an example architecture where a DSMIP-based IP flow management and bandwidth aggregation may be implemented. In this example, a WTRU 610 is simultaneously connected to the 3GPP network 630 (GERAN/UTRAN) and the WLAN 640, respectively. Two separate IP paths are anchored at the HA 620, which may be collocated with the GGSN in the 3GPP packet switched core network. In this example, the WTRU 610 has a single IP address called home address (HoA) and two separate IP addresses called care-of-addresses (CoAs). The HoA may be assigned by the 3GPP network and may also be used as the CoA corresponding to the 3GPP radio access network. The other IP address, CoA2, is assigned by the WLAN network. Applications may operate on the WLAN, in which case the CoA2 will be used. Applications may operate on both the WLAN and 3GPP networks, in which case both CoA1 and CoA2 are used in parallel via the DSMIP protocols. Bandwidth aggregation may be implemented by executing DSMIP messages and procedures, which will be explained in detail below. The HA in FIG. 6 is shown to be located in the mobile core network. However, as stated above, it may be located outside of the network or near the network edge, for example in a device like a converged femto-WiFi gateway or a small-cell gateway.

In order to enable an IP flow (e.g., FID1) to be split and transported over multiple links (e.g., BID1/CoA1 and BID2/CoA2), the IP flow may be assigned to multiple CoAs, as shown in Table 1.

TABLE 1

| Home Address | Routing Address | Binding ID | BID Priority | Flow ID | FID Priority | Routing Filter |
|---|---|---|---|---|---|---|
| HoA1 | CoA1 | BID1 | X | FID1 | A | Description of IP flows |
|  |  |  |  | FID2 | B | Description of IP flows |
| HoA1 | CoA2 | BID2 | Y | FID1 | A | Description of IP flows |

Table 1 shows an example binding cache in an anchor node (e.g., HA) supporting flow splitting/aggregation. In this example, FID1 is assigned to both CoA1 and CoA2 such that the IP packets that belong to FID1 are split and transported toward CoA1 and CoA2, respectively via two or more interfaces.

The sender (e.g., a WTRU or an anchor node) may split and forward the packets on multiple interfaces without sending any signaling to the receiver. The receiver in turn processes the packets received on each interface and combines them according to the packet header details (e.g., the 5-tuples (i.e., the source and destination IP addresses, the source and destination port numbers, and the protocol type).

Alternatively, the sender may signal to the receiver details of the flow splitting. For example, the flow identification mobility option of the binding update (BU) message may be modified to convey this information.

Figure 7:
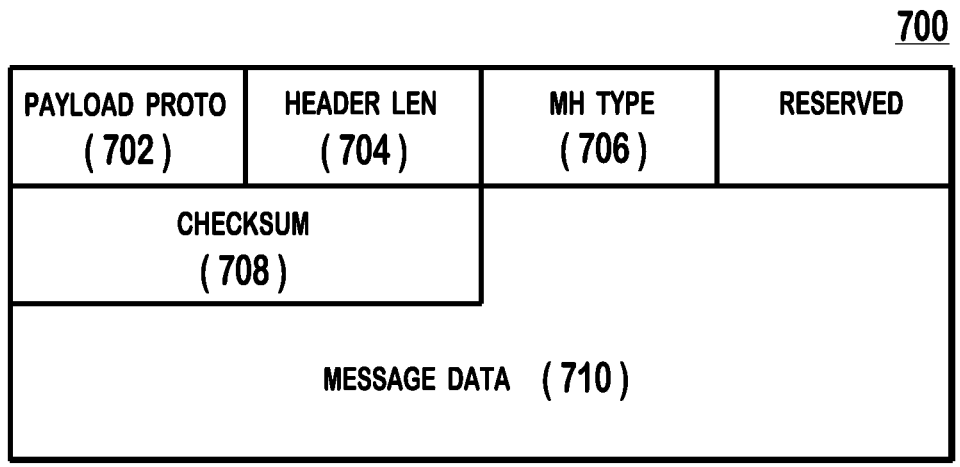
FIG. 7 shows a Mobility Header format.

FIG. 7 shows a mobility header format 700. A mobility header is an extension header used by mobile nodes, correspondent nodes, and home agents in messaging related to the creation and management of bindings. The Payload Proto field 702 identifies the type of header immediately following the mobility header. The Header Len field 704 represents the length of the mobility header. The MH Type field 706 identifies the particular mobility message in question. The Checksum field 708 contains the checksum of the mobility header. The Message Data field 710 is a variable length field containing the data specific to the indicated mobility header type. Mobile IPv6 defines a number of mobility options for use within these messages.

Figure 8:
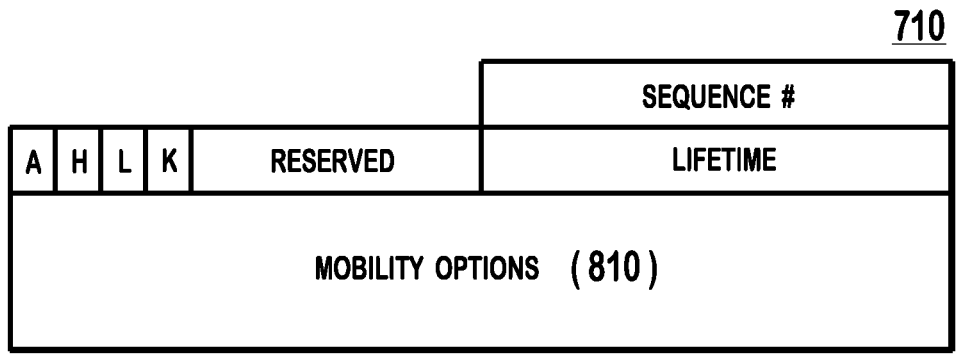
FIG. 8 shows the Message Data field format in the Mobility Header when the mobility header type field indicates binding update.

FIG. 8 shows the Message Data field format 710 in the mobility header when the MH Type field 706 indicates binding update. A BU message is used by a mobile node to notify other nodes of a new CoA for itself. The Mobility Options field 810 is a variable-length field that contains zero or more mobility options.

The flow identification mobility option is one of the mobility options, and is included in the BU and binding acknowledgement (BA) messages. The flow identification mobility option contains information that allows the receiver of a binding update to install policies on a traffic flow and route it to a given CoA. Multiple options may be included within the same BU message.

Figure 9:
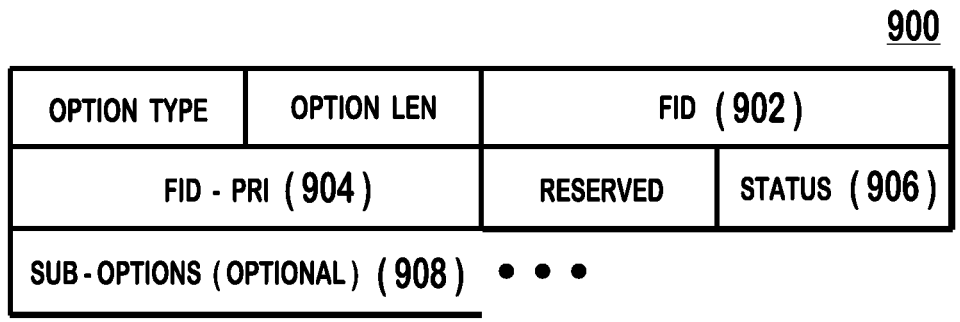
FIG. 9 shows the flow identification mobility option format.

FIG. 9 shows the flow identification mobility option format 900. The FID field 902 includes the unique identifier for the flow binding. The FID-PRI filed 904 indicates the priority of a particular option. The Status field 906 indicates the success or failure of the flow binding operation for the particular flow in the option. The Sub-options field 908 includes zero or more sub-options.

Figure 10:
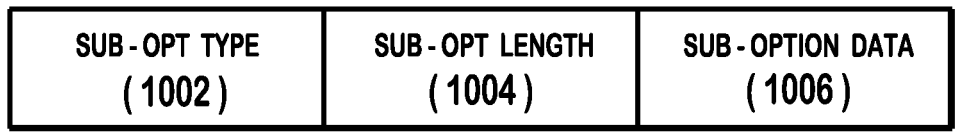
FIG. 10 shows a flow identification sub-option field format.

FIG. 10 shows a flow identification sub-option field format 908. The Sub-Opt Type field 1002 indicates the sub-option type. The Sub-Opt Len field 1004 represents the length in octets of the flow identification sub-option. The Sub-Option Data field 1006 is a variable length field that contains data specific to the sub-option. The currently defined sub-options include Pad1 (type=0), PadN (type=1), binding reference sub-option (type=2), traffic selector (type=3).

Figure 11:
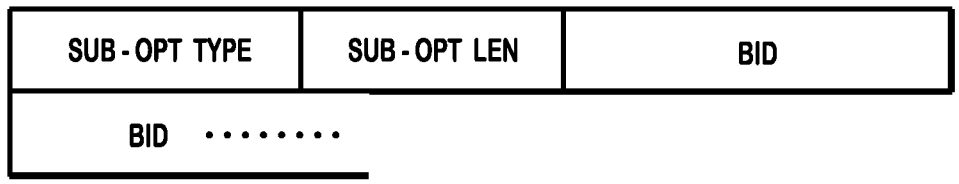
FIG. 11 shows the binding reference sub-option format.

The binding reference sub-option includes one or more BIDs, and associates the flow described in the flow identification mobility option with one or more registered BIDs. FIG. 11 shows the binding reference sub-option format.

The traffic selector includes the parameters used to match packets for a specific flow binding. When a packet matches the traffic selector of a given entry, a copy of the packet is forwarded to each of the care-of addresses associated with the BIDs indicated in the same line of the table.

Figure 12:
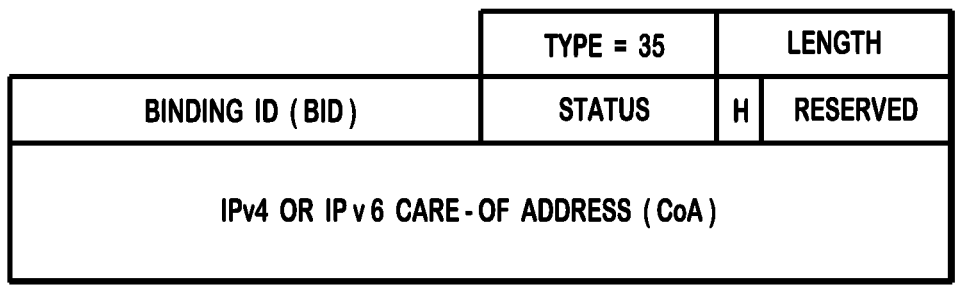
FIG. 12 shows the binding identifier referenced in the binding reference sub-option.

FIG. 12 shows the binding identifier referenced in the binding reference sub-option. The binding ID field indicates the BID that is assigned to the binding indicated by the CoA in the binding update or the binding identifier mobility option.

Figure 13:
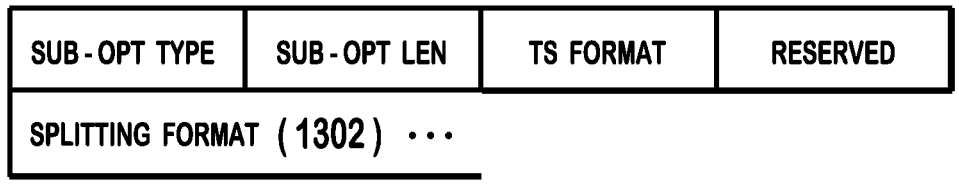
FIG. 13 shows an example Flow Splitting Sub-Option format.

In accordance with one embodiment, a new sub-option (e.g., Flow-Split with type=4) may be defined to indicate the bandwidth aggregation information. FIG. 13 shows an example Flow Splitting Sub-Option format 1300. For example, the splitting format field 1302 may be codified as (N(k),M,k) to indicate that N(k) packets out of every M packets are sent on the k-th interface. Any other formats may be used.

Figures 14, 15:
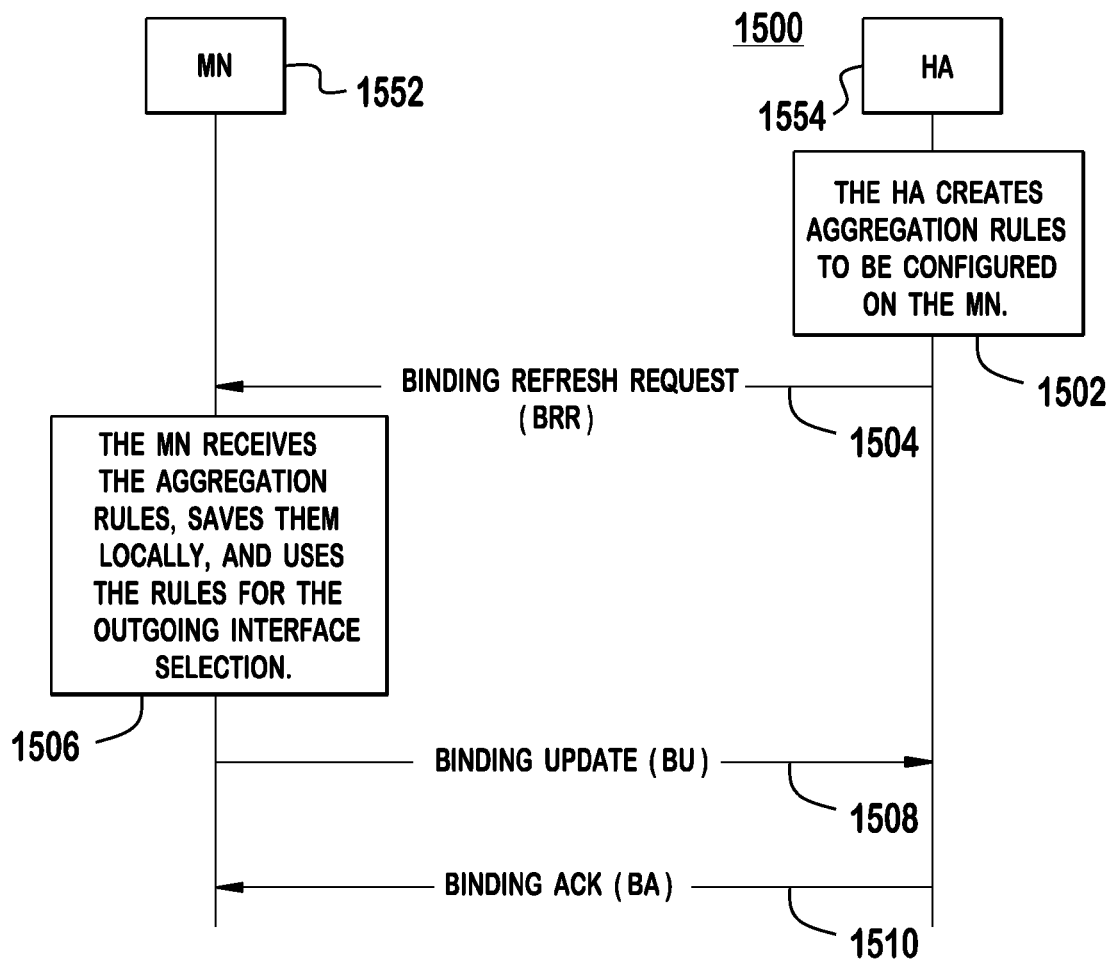
FIG. 14 shows the binding reference sub-option format including the bandwidth aggregation information.
FIG. 15 is a flow diagram of an example process of network-controlled bandwidth aggregation.

In another embodiment, the binding reference sub-option may be used to carry the binding identifiers and distribution proportions. FIG. 14 shows the binding reference sub-option format 1400 including the bandwidth aggregation information. The receiver may set the destination field in the flow table to a list of binding identifiers 1402a, 1402b and distribution proportion 1404a, 1404b specified in the binding reference sub-option.

The BID field 1402a, 1402b represents the binding entry to be used to forward the data. The binding entry contains the CoA (end-point tunnel) to send data. The proportions field 1404a, 1404b represents the distribution proportion for the corresponding BID. To specify the distribution proportions, a list of [BID,%] pair may be specified. If one pair is specified, the percentage may be set to 100, (i.e., in this case, all traffic is sent to the specified BID). If more than one pair of [BID,%] are included, the sum of the percentage may be equal to 100. The distribution proportions specified by % is an example to quantify the proportion, and any other method may be used, (e.g., number of packets per interface such as 1 packet on interface 1 and 3 packets on interface 2).

The IP packets may be duplicated by specifying a list of BIDs with the flow identification sub-option. The duplication may be implemented with the new format of the binding reference sub-option (or new flow mobility sub-option). A list of [BID,%] pairs may be given for bandwidth aggregation along with a [BID,%] pair with %=100 for flow duplication. For example, in case where 60% of traffic goes to BID1 and 40% of the traffic goes to BID2 and the traffic is duplicated to BID3, it may be encoded as follows: BID1, 60, BID2, 40, BID3, 100.

The bandwidth aggregation may be mobile-controlled or network-controlled. For example, for the mobile-controlled bandwidth aggregation, a BU message may be used, and for the network-controlled bandwidth aggregation, a BA or binding refresh request (BRR) message may be used. Alternatively, a new message or sub-option for aggregation support may be defined and used with, for example, the BU, BA, and BRR by the MN and the HA.

The MN (i.e., a WTRU) may configure aggregation rules on the HA (i.e., anchor node) and the HA may configure aggregation rules on the MN. The MN and the HA may configure different aggregation rules locally compared to what it has configured on the HA and on the MN, respectively. For example, Flow A may be sent by the HA toward the MN in the downlink with 60% of traffic on a cellular network and 40% on a WLAN, but the Flow A in the MN to the HA in the uplink may be sent with 30% on the cellular network and 70% on the WLAN.

FIG. 15 is a flow diagram of an example process of network-controlled bandwidth aggregation. The HA 1554 creates aggregation rules to be configured on the MN 1552 (1502). The aggregation rules to be configured on the MN 1552 for uplink transmission may be different than what is used by the HA 1554 for downlink transmission. The HA 1554 may send a BRR message to the MN 1552 including the binding reference sub-option or a new flow mobility sub-option with the distribution proportions over multiple BIDs, (e.g., FID1, BID1, 30%, BID2, 70%) (1504).

The MN 1552 receives the BRR and the aggregation rules, saves them, and may use the aggregation rules for selecting interfaces for the outgoing packets (1506). If the MN 1552 does not have flow aggregation rules associated with the binding, the MN 1552 creates them. This may occur if the binding entry exists but does not have any flow filters associated with it. The MN 1552 sends a BU message to the HA 1554 (1508). The MN 1552 may repeat the received aggregation rules on the BU message to indicate that they are accepted. The HA 1554 sends an BA message to the MN 1552 (1510).

Figure 16:
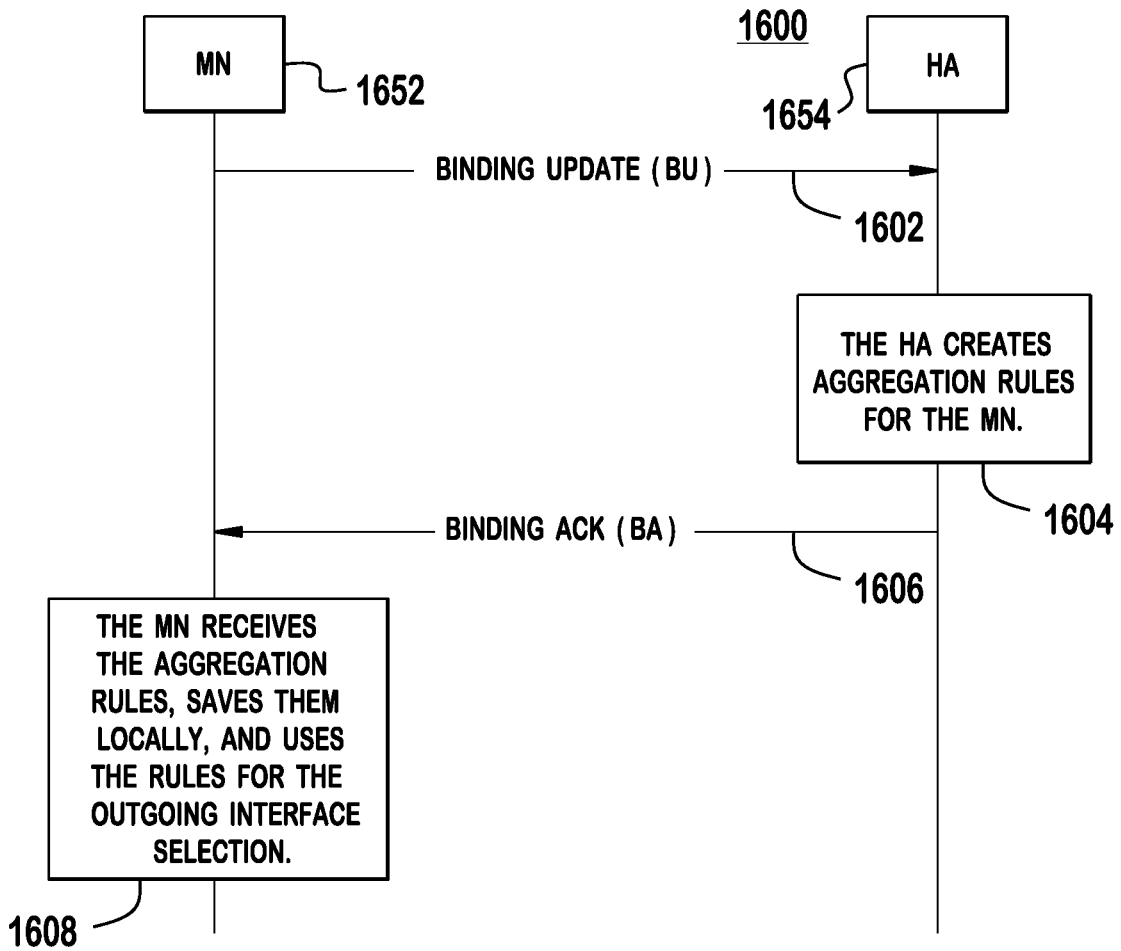
FIG. 16 is a flow diagram of another example process of network-controlled bandwidth aggregation.

FIG. 16 is a flow diagram of another example process of network-controlled bandwidth aggregation. A MN 1652 sends a BU message to the HA 1654 (1602). The HA 1654 wants to configure aggregation rules on the MN 1652, and creates aggregation rules to be configured on the MN 1652 (1604). The aggregation rules to be configured on the MN 1652 may be different than what is used on the HA 1654. The HA 1654 sends a BA message to the MN 1652 including the binding reference sub-option or a new flow mobility sub-option with the distribution proportions over multiple BIDs (1606). The MN 1652 receives the aggregation rules, saves them, and may use the aggregation rules for selecting interfaces for the outgoing packets (1608).

In one embodiment, the HA may request the MN to send information (e.g., measurements) to the HA periodically, at request by the HA, upon a specific triggering event, or the like. The HA may use the information received from the MN to adapt the distribution proportions when aggregation is used or it may propagate this information to another layer, (e.g., a connection manager).

To support this, a new mobility option may be introduced. For example, the HA may request MN's measurements, stats, etc. by including a specific sub-option(s) in the BRR or BA message or into any other DSMIP message sent from the HA to the MN. The new mobility option may include MN's measurements, stats, or information to be sent from the MN to the HA. For example, the BU message may be used by the MN to send the requested information to the HA. In the event that the MN needs to send other information, (e.g., distribution rules), it may be carried by the BU message. An MN that does not support these options may simply ignore them.

Figure 17:
FIG. 17 shows an example format for the mobility option for information request that may be used by the home agent (HA) with the binding refresh request (BRR) or binding acknowledgement (BA) message, or any other message.

FIG. 17 shows an example format for the mobility option for information request that may be used by the HA with the BRR or BA message, or any other message. The Type field 1702 represents the required information. For example, Type=10 may represent that MN's number of packets received per flow is requested, and Type=11 may represent that MN's stats are requested. The Option Data field 1704 is a list of flow IDs. For example, in case where the requested MN's measurement is the number of packets received for the flow 1 and flow 2, the Type field 1702 may be set to 10 and the Option Data field 1704 may be set to FID1, FID2. In the response from the MN, the Option Data field 1704 may contain the number of packets received for FID1 followed by the number of packets received for FID2.

Figure 18:
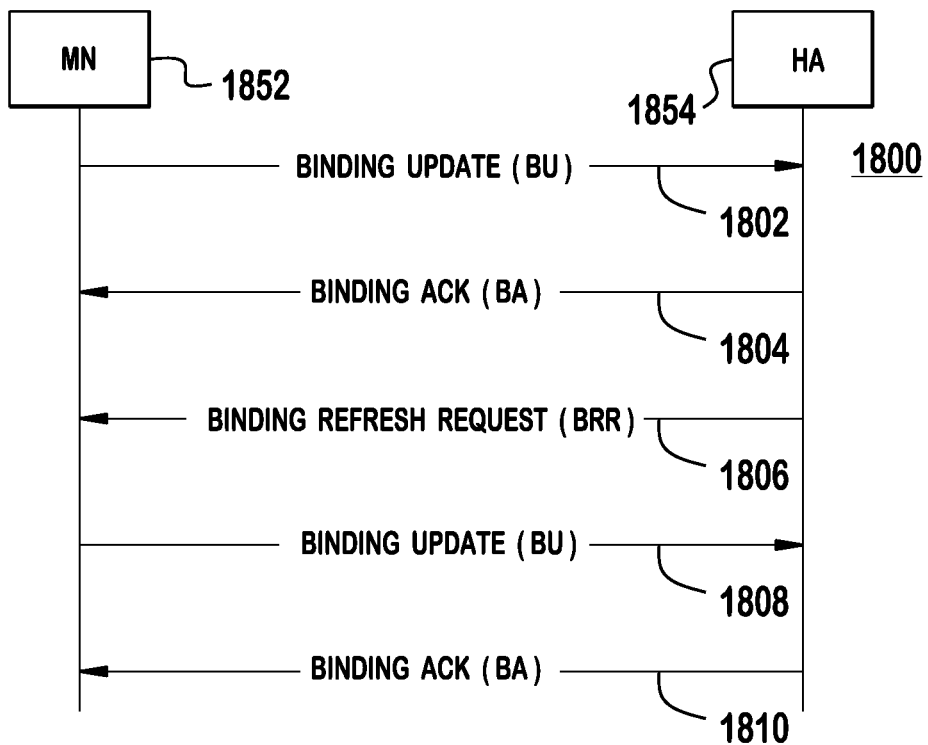
FIG. 18 is a signaling diagram of an example process for information request from the mobile node (MN)

FIG. 18 is a signaling diagram of an example process for information request from the MN. An MN 1852 sends a BU message to the HA 1854 (1802). The HA 1854 sends a BA message to the MN 1852 in response to the BU message (1804). The HA 1854 wants to obtain, for example, the number of packets received for FID1. The HA 1854 sends a BRR message (e.g., type=10, FID1), to the MN 1852 to request that information from the MN 1852 (1806). The MN 1852 receives the request, gets the information, and sends a BU message (e.g., Type=10, FID1, the number of packets received) including the requested information (1808). The HA 1854 responds with a BA message in response to the BU message (1810).

Currently, DSMIPv6 is used to register the MN's location and temporary IP address with the HA so that a connectivity is maintained. The HA binds the temporary IP address to the HoA which is known by the peers and which remains associated with the MN even when the MN is moving. With the enhancements to DSMIPv6 to additionally exchange information specific to the MN as disclosed above, the HA may take appropriate decisions to set aggregation rules, or may use for any other purposes.

Embodiments for implementing bandwidth aggregation using PMIP are disclosed hereafter.

Figure 19:
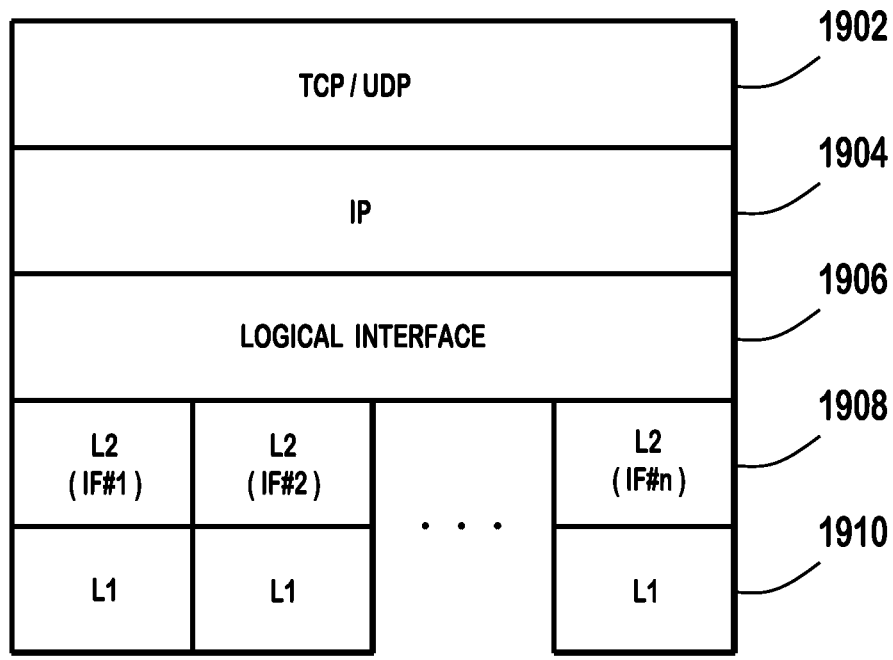
FIG. 19 shows an example protocol stack of a WTRU including a logical interface.
Figure 20:
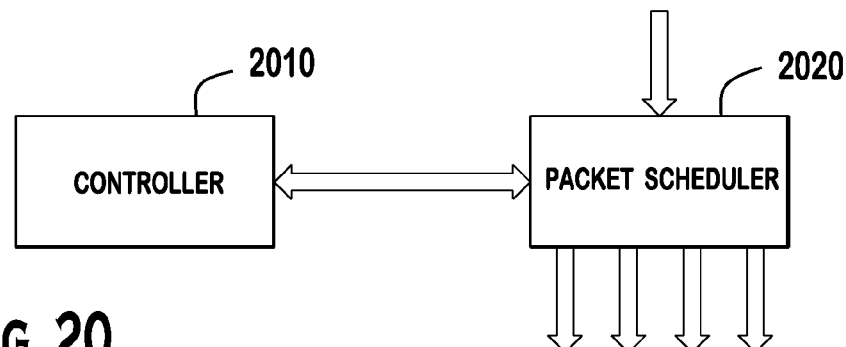
FIG. 20 is a high level representation of the controller and the packet scheduler in the logical interface.

FIG. 19 shows an example protocol stack of a WTRU including a logical interface 1906. The WTRU may include a TCP/UDP layer 1902, an IP layer 1904, a logical interface 1906, and a plurality of layer 2 (L2) 1908 and layer 1 (L1) 1910 for a plurality of interfaces. A logical interface 1906 is a construct internal to the operating system. The logical interface 1906 sits between the IP layer 1904 and layer 2 (L2) 1908. The logical interface 1906 hides the use of multiple physical interfaces from the IP stack. A host does not see the difference between a logical interface and a physical interface. The logical interface 1906 appears as just another interface to the IP stack. The logical interface allows heterogeneous attachment while leaving the change transparent to the IP layer.

The logical interface 1906 keeps track of incoming traffic on all interfaces so that it may use (e.g., mirror) the IP flow movements initiated by the network for outgoing packets. For example, the logical interface 1906 may maintain a mapping table with the specific IP flow (identified by the 5-tuple) and the incoming interface. Incoming packets are intercepted by the logical interface 1906 and the mapping table is updated, if required. The packets are delivered to the higher layer without being modified. For outgoing packets, the logical interface 1906 intercepts the outgoing packets and selects the outgoing interface based on the IP flow (5-tuple) of the outgoing packets and the saved information about incoming packets in the mapping table. The packets are sent over the selected outgoing interface.

In one embodiment, in order to support bandwidth aggregation in the logical interface 1906, a packet scheduler and a controller are introduced in the logical interface 1906. FIG.

20 is a high level representation of the controller 2010 and the packet scheduler 2020 in the logical interface 1906. The packet scheduler 2020 is responsible for the allocation of packets across multiple interfaces based on rules defined in the packet scheduler 2020. The packet scheduler 2020 knows the distribution of outgoing packets over the available interfaces and determines to which interface the IP packets should be sent based on the outgoing packet statistics. The controller 2010 evaluates how the packets are to be distributed and maintains the desired flow distribution and then configures the packet scheduler 2020 with that information.

For outgoing packets, the logical interface 1906 intercepts the packets and looks at the table in the controller 2010 which contains the distribution of the incoming packets. If a match is found, the IP packet may be directed to the interface selected by the packet scheduler 2020. Each flow goes through its own packet scheduler 2020 where according to the rules defined in the packet scheduler the flow is divided among the available interfaces. The rules are defined in the packet scheduler 2020.

In implementing bandwidth aggregation using the logical interface and PMIPv6, there may be no signaling between the WTRU and the anchor node. In one embodiment, the logical interface 1906 may use (e.g., mirror) the distribution of incoming packets for outgoing packets. The network may place packets on different interfaces according to specific proportions. For example, if over some pre-defined period, the logical interface 1906 observes 60% of incoming traffic on a first interface and 40% on a second interface, the logical interface 1906 may use this proportion in the uplink such that 60% of outgoing traffic is placed on the first interface and 40% of outgoing traffic is placed on the second interface. This may be extended to more than two interfaces.

The logical interface 1906 may look at last M incoming packets (let $M_i$ be the number of packets arriving on interface i ($IF_i$)), and distribute the outgoing packets such that [$M_i$/M× 100]% of the packets are sent over $IF_i$. The calculation of the above distribution may be done in the controller 2010 and then fed to the packet scheduler 2020, which will divide the packets from the upper layer according to this rule. In case where an interface is deleted or added, the last M packets may be resent (M is an arbitrary number of packets just before the interface was deleted or added) and then the above rule may be applied again. In addition, the distribution of the outgoing packets may be based not only on the distribution of the incoming packets but also on a scalar depending on the interface characteristics. Where among the last M incoming packets $M_i$ is the number of packets arriving on interface I, $S_i$ is a scale factor for each interface, and S is the sum of the scale factors, the outgoing packets may be distributed such that [($M_i \times S_i$)/(M×S)×100]% of the packets are sent over interface i.

In this embodiment, there is no signaling involved as no messages are exchanged over the network. This approach is considered dynamic since the load balancing is done based on how a proportion of the number of packets is received at a particular interface of the WTRU.

At the receiving end of the WTRU, when packets arrive over another interface instead of the current interface, the WTRU may determine whether the packet arriving over the new interface is due to a transfer of the IP flow from the current interface to the new interface (i.e., IFOM) or there is a splitting of the IP flow between the current interface and the new interface (i.e., bandwidth aggregation).

A control message may be sent from the anchor node (e.g., local mobility anchor (LMA) such as PDN gateway (PGW) or GGSN) to the WTRU via the mobility access gateway (MAG) (such as a serving gateway (SGW) or SGSN), informing beforehand that packets will be arriving over a new interface and that this is either IP flow mobility or bandwidth aggregation.

Alternatively, a timer may be used in the logical interface 1906. The timer may be triggered once a packet arrives over a new interface. The WTRU starts the timer (e.g., T1) and the timer may be used to determine whether the network implements IP flow mobility or bandwidth aggregation. If the number of IP packets arriving on the current interface is less than a certain number N, where N is small, the WTRU may determine that it is IP flow mobility and the flow is being transferred from the current interface to the new interface. If this condition is not satisfied, the WTRU may determine that it is bandwidth aggregation, and packets of the same IP flow are arriving over both the current interface and the new interface. During the interval of the timer T1, uplink packets may be sent over the new interface because during this interval it is not determined whether there is flow mobility or bandwidth aggregation. At the end of the timer, if it is determined as bandwidth aggregation, the estimated downlink distribution may be used for the uplink. If it is determined as flow mobility, the WTRU may transfer the IP flow from the current interface to another in downlink and uplink. With a timer, there is no need for creating new control signaling messages and therefore no additional signaling overhead is incurred.

Figure 21:
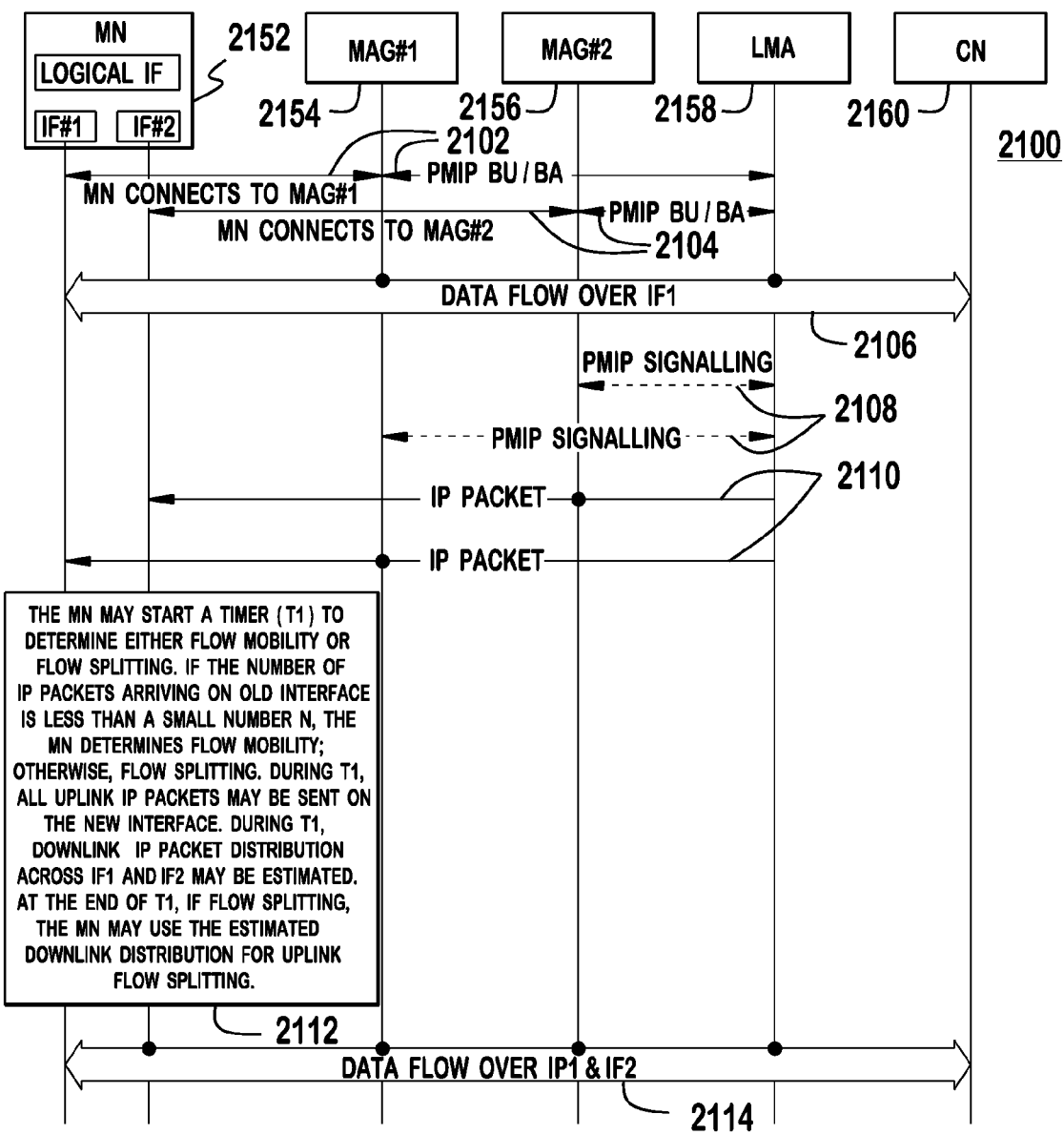
FIG. 21 is a flow signaling diagram of an example process of bandwidth aggregation in Proxy Mobile IP version 6 (PMIPv6) with no WTRU-anchor node signaling and with CN-based communication.

FIG. 21 is a signaling diagram of an example process 2100 of bandwidth aggregation in PMIPv6 with no WTRU-anchor node signaling and with CN-based communication. Both interfaces (IF1 and IF2) of the MN 2152 are up. The MN 2152 connects to both MAG1 2154 and MAG2 2156, and the PMIP registration is done by exchanging PMIP BU and BA messages between the LMA 2156 and MAG1 2154 and MAG2 2156, respectively (2102, 2104). At the LMA 2158, 2 binding entries exist for the MN 2152, one for each interface. The LMA 2158 sends IP packets received from the core network (CN) 2160 on IF1 via MAG1 2154, and the logical interface of the MN 2152 transmits packets on the uplink on the same interface (IF1 in this example) on which the downlink packets are received (2106). The LMA 2158 decides to split the IP flow across IF1 and IF2, and update the binding cache. The LMA 2158 may propagate the MN's IP addresses and other information to MAG1 2154 and MAG2 2156 (2108). No control messages may be sent to the MN 2152 either by the LMA 2158 or MAG1 2154 or MAG2 2156.

The LMA 2158 sends packets of the IP flow via IF1 and IF2 via MAG1 2154 and MAG2 2156, respectively, in accordance with the distribution rules (2110). The MN 2152 starts a timer (T1) to determine whether flow mobility or flow splitting (bandwidth aggregation) is performed (2112). If the number of IP packets arriving on old interface (IF1 in this example) is less than a small number N, the MN 2152 determines that it is flow mobility. Otherwise, the MN 2152 determines it is flow splitting. During T1, uplink IP packets may be sent on the new interface (IF2 in this example). During T1, downlink IP packet distribution across IF1 and IF2 may be estimated. At the end of T1, if flow splitting, the estimated downlink distribution may be used for uplink flow splitting (2114).

Alternatively, signaling may be exchanged between the MN (i.e., WTRU) and the LMA (via the MAG). Three different use cases are explained as shown in Table 2.

TABLE 2

| Use Case | Downlink | | | Uplink | | | |
|---|---|---|---|---|---|---|---|
| | NW Initiated | WTRU Initiated | Negotiated | NW Initiated | WTRU Initiated | Negotiated | Mirrored |
| 1 | X | | X | | | | X |
| 2 | X | | X | | X | X | |
| 3 | X | | X | X | | X | |

Use Case 1: network-initiated and negotiated downlink bandwidth aggregation and mirrored uplink bandwidth aggregation.

To implement bandwidth aggregation using the logical interface and PMIPv6, the network may send a signaling message to the WTRU (i.e., MN) containing the percentage of packets that need to be transmitted over each interface. For example, the network may indicate that x% of packets should be transmitted over a first interface (e.g., a cellular network), and (100–x)% of packets should be transmitted over a second interface (e.g., a Wi-Fi network). The network is responsible for deciding how the data load should be balanced among the interfaces. When the traffic load changes or a new interface is detected or an interface is deleted, the network may re-evaluate the number of packets that should be sent over each interface and then send another signaling message to the WTRU. The WTRU may use the received downlink packet distribution across the interfaces for uplink transmission.

Figure 22:
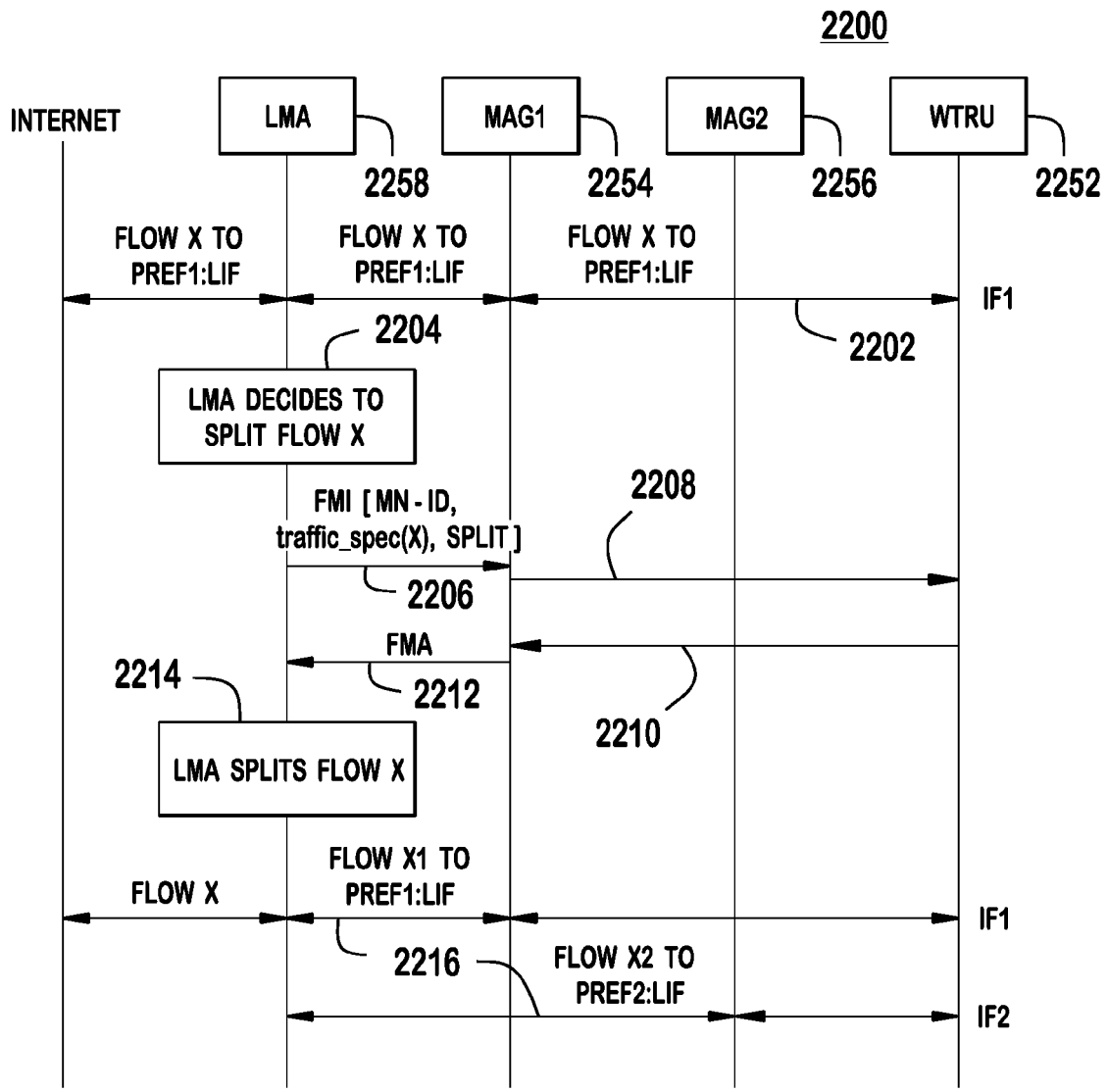
FIG. 22 is a signaling diagram of a process for network-initiated and negotiated downlink bandwidth aggregation and mirrored uplink bandwidth aggregation.

FIG. 22 is a signaling diagram of a process 2200 for network-initiated and negotiated downlink bandwidth aggregation and mirrored uplink bandwidth aggregation. The WTRU 2252 (i.e., MN) is connected to MAG1 2254 and MAG2 2256 via a logical interface (2 IP addresses in this example). MAG1 2254 and MAG2 2256 are connected to the LMA 2258 via PMIPv6 tunnels. The LMA 2258 sends downlink packets on flow X to the WTRU 2252 on IF1 via MAG1 2254 and the WTRU 2252 also send uplink packets on flow X on IF1 via the MAG1 2254 (i.e., the WTRU 2252 may use the same distribution (i.e., mirror)) (2202). The LMA 2258 decides to split the flow (2204). The LMA 2258 may send, for example, a flow mobility initiate (FMI) message to the MAG1 2254 (2206). The MAG1 2254 may send a message (e.g., RA message) to the WTRU 2252 to configure the rule (2208), and the WTRU 2252 may send an ACK message to the MAG1 2254 (2210). The MAG1 2254 responds with, for example, a flow mobility acknowledgement (FMA) message (2212). The LMA 2258 splits flow X (2214) and sends packets of the flow X to the WTRU 2252 on both IF1 and IF2 via the MAG1 2254 and the MAG2 2256 (2216). The WTRU 2252 follows the received rules from the LMA 2258 for the distribution on the uplink (2216).

In order for the network to send a control signaling message, for example, the FMI message may be modified to carry the control information on how to transmit data over multiple interfaces. FIGS. 23A and 23B show conventional FMI message format and new FMI message format in accordance with one example embodiment, respectively. As shown in FIG. 23B, another option (e.g., bandwidth aggregation option) may be added below the mobility options in the packet format. The new option 2310 (bandwidth aggregation option) may contain information, such as MN link layer identifier, the type of interface (e.g., Wi-Fi, 3GPP, WiMax, etc.), a flow identifier field, and percentage of packets. The flow identifier field includes a unique identifier for the flow binding. It is used to refer to an existing flow that the LMA is going to move from one interface to another. The percentage of packets indicate the allocation of packets to an interface as decided by the LMA. If there is more than one interface, each interface may be assigned the MN link layer identifier and each interface may be given the percentage of packets that will be transmitted over it. The percentage may be determined by the network.

Alternatively, a new signaling message may be created for this purpose. The new signaling message may contain information on how packets are to be transmitted over multiple interfaces between the network and the WTRU.

When the LMA sends the control information regarding bandwidth aggregation, it is received by the MAG. In PMIPv6, when the MAG receives the proxy binding acknowledgement (PBA) message from the LMA with the home network prefixes, the MAG may generate the router advertisement message. The router advertisement message include a home network prefix (HNP) supplied by the LMA, and this message may be forwarded by the MAG to the WTRU. The WTRU may use the HNP from the router advertisement message to configure its IP address on that interface.

In one embodiment, the router advertisement message may be extended to include information about splitting of a flow over multiple interfaces. FIGS. 24A and 24B are the conventional router advertisement message and the new router advertisement message including a new option, respectively. The router advertisement message may include a new option 2410 (e.g., bandwidth aggregation option) similar to the one included in the FMI message. The bandwidth aggregation option 2410 may include the MN link layer ID, the interface type, the flow ID, and the proportion of packets. The proportion of packets indicate the percentage of packets that will arrive over that specific interface and the MAG may not need to know about the proportion of packets over other interfaces.

Alternatively, the bandwidth aggregation information may be forwarded to the WTRU via non-access stratum (NAS) signaling. The NAS protocols form the highest stratum of the control plane between the WTRU and the MME. The NAS signaling terminates at the MME. NAS protocols support mobility of the WTRU and the session management procedures to establish and maintain IP connectivity between the WTRU and the PGW (which is the LMA in a PMIPv6 network model).

In order to use the NAS signaling, a 3GPP access is needed since the NAS protocol is mainly defined for 3GPP access. While other embodiments are applicable to any configuration, this embodiment is specific to the core network-based BWA as it takes advantage of the presence of the core network capabilities.

If the network decides to split a flow it may send an NAS signaling message from the SGW (i.e., MAG) to the WTRU via an MME. NAS signaling is between the MME and the WTRU. The MME is connected to the SGW via an S11 interface. The SGW may forward the control information sent by the PGW (i.e., LMA) to the MME and the MME may send this information to the WTRU via NAS signaling.

Since the LMA is sending the control signaling message to the WTRU via the MAG to tell the WTRU how to distribute the packets among the multiple interfaces, the WTRU may send an acknowledgement to the LMA, via the MAG, informing the network that it has received the message. In order to send an acknowledgement, a new message may be created that is sent from the WTRU to the LMA via the MAG. The MAG on receiving the acknowledgement message simply forwards the message to the LMA. The acknowledgement ensures that the WTRU received the control signaling message from the network. If within a certain time period, using a timer, the network does not receive an acknowledgement from the WTRU, the network may assume that the signaling message is not received by the WTRU and may retransmit the signaling message.

Packets arrive at the WTRU via multiple interfaces at different rates. Some packets may arrive via one interface much before the packets arriving from the other interface. When packets go from the IP layer to the TCP layer, they may be out-of-order and not all the packets may have arrived, which leads to gaps in between.

In one embodiment, to avoid this, an adaptive buffer may be included in the logical interface 1906. In the WTRU side, when IP packets arrive, the TCP packets are extracted from the IP packets that have been received from multiple IP interfaces and the adaptive buffer buffers the packets until all the packets have arrived before sending them to the TCP layer.

The logical interface 1906 may include the packet scheduler 2020 for the uplink as described above and the adaptive buffer for the downlink. The packet scheduler 2020 is responsible for assigning the percentage of packets that need to be transmitted over multiple interfaces in the uplink. The adaptive buffer is responsible for buffering the packets received at the IP layer until all packets have arrived from the network before forwarding them to the IP layer.

Use case 2: network-initiated and negotiated downlink bandwidth aggregation, and independent WTRU-initiated and negotiated uplink bandwidth aggregation.

Unlike in use case 1 where the WTRU simply uses the downlink flow splitting for the uplink, in use case 2, the WTRU may control the uplink flow splitting independently. In case where packets are arriving on one of the interfaces and no packets are arriving over other interfaces, in order to increase the rate of transmission of packets, the WTRU may decide to split the uplink flow over the two interfaces so that there is a higher bandwidth.

In one embodiment, a new control signaling message may be sent by the WTRU to the LMA. The control message sent by the WTRU may be received by the MAG and the MAG may simply forward it to the LMA. In the current PMIPv6, a router solicitation message sent by the WTRU is received by the MAG, and the MAG sends a PBU message to the LMA. Upon receiving the PBU message the LMA responds with a PBA message to the MAG. The MAG then creates a router advertisement message and forwards the information sent by the LMA to the WTRU. In one embodiment, the router solicitation message may include the uplink bandwidth aggregation option. The LMA may respond back via an extended router advertisement message, if the LMA does not approve of the uplink bandwidth aggregation option. This leads to a negotiated uplink bandwidth aggregation initiated by the WTRU.

Figure 25:
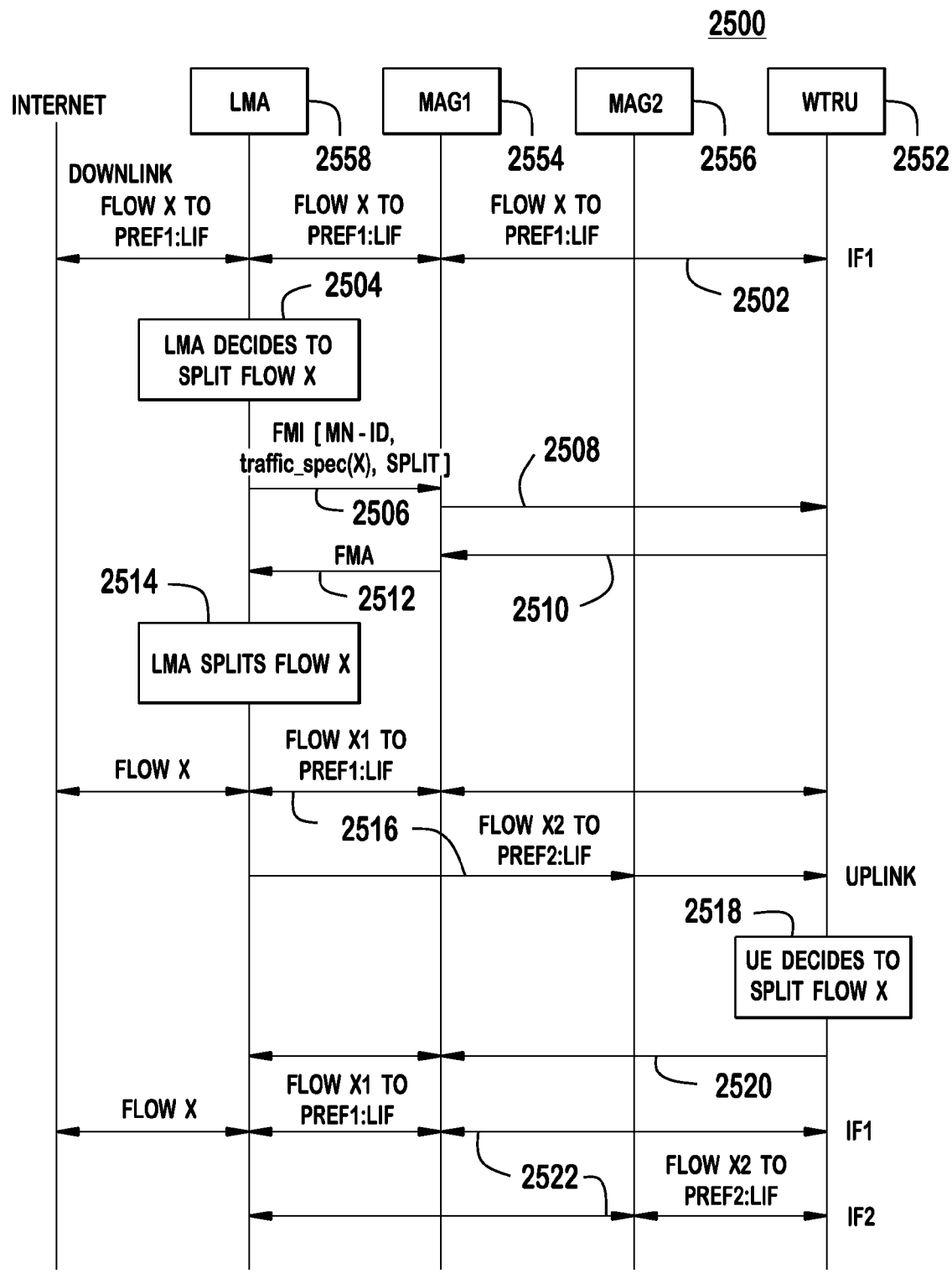
FIG. 25 is a signaling diagram of an example process for flow mobility with bandwidth aggregation in PMIPv6 where a WTRU controls the uplink flow splitting.

FIG. 25 is a signaling diagram of an example process 2500 for flow mobility with bandwidth aggregation in PMIPv6 where a WTRU 2552 controls the uplink flow splitting. The WTRU 2552 (i.e., MN) is connected to the MAG1 2554 and the MAG2 2556 via a logical interface (2 IP addresses in this example). The MAG1 2554 and the MAG2 2556 are connected to the LMA 2558 via PMIPv6 tunnels. The LMA 2558 sends downlink packets on flow X to the WTRU 2552 on IF1 via the MAG1 2554 and the WTRU 2552 also send uplink packets on flow X on IF1 via the MAG1 2554 (2502). The LMA 2558 decides to split the flow (2504). The LMA 2558 sends a flow mobility initiate (FMI) message to the MAG1 2554 (2506). The MAG1 2554 may send a message (e.g., RA message) to the WTRU 2552 to configure the rule (2508), and the WTRU 2552 may send an ACK message to the MAG1 2554 (2510). The MAG1 2554 responds with a flow mobility acknowledgement (FMA) message (2512). The LMA 2558 splits flow X (2514) and sends packets of the flow X to the WTRU 2552 on both IF1 and IF2 via the MAG1 2554 and the MAG2 2556 (2516). The WTRU 2552 sends uplink packets on IF1 via the MAG1 2554 at this stage (2516). The WTRU 2552 decides to split flow X (2518). The WTRU 2552 may send a message to the LMA 2558 via the MAG1 2554 to split the flow (2520). If it is accepted, the WTRU 2552 may send packets to the LMA 2558 on IF1 and IF2 via the MAG1 2554 and the MAG2 2556 (2522).

Use case 3: network-initiated and negotiated downlink bandwidth aggregation and independent network-initiated and negotiated uplink bandwidth aggregation.

In this case, the uplink and downlink packet distribution may be independent of each other. The network may determine the uplink packet distribution and the WTRU may apply this packet distribution for its uplink packet distribution. The uplink may not necessarily follow the same distribution of the downlink. The network may send a signaling message to the WTRU as in use case 1, except that the signaling message includes control information for both uplink and downlink packet distribution. For example, the FMI message (or any other message) may include both uplink and downlink packet distribution.

In another embodiment, a hybrid method may be used. The sender may autonomously determine how individual packets of an IP flow are split across multiple interfaces. The sender may base this determination on knowledge of radio conditions, network conditions, application requirements, etc. However, there may be no priori signaling sent to the receiver. The receiver may compute aggregate metrics of the IP packets received on each of the multiple paths and report them back to the sender at periodic or event-driven instants of time. The reporting may be performed using bandwidth aggregation protocols (such as DSMIP or PMIP) or using access network specific protocols (such as cellular and WiFi). The sender may adjust the IP flow splitting based on the reported information. For example, if the report indicates that the IP packets on the WiFi path are received with large delay, the sender may reduce the amount of data sent on the WiFi link.

Figure 26:
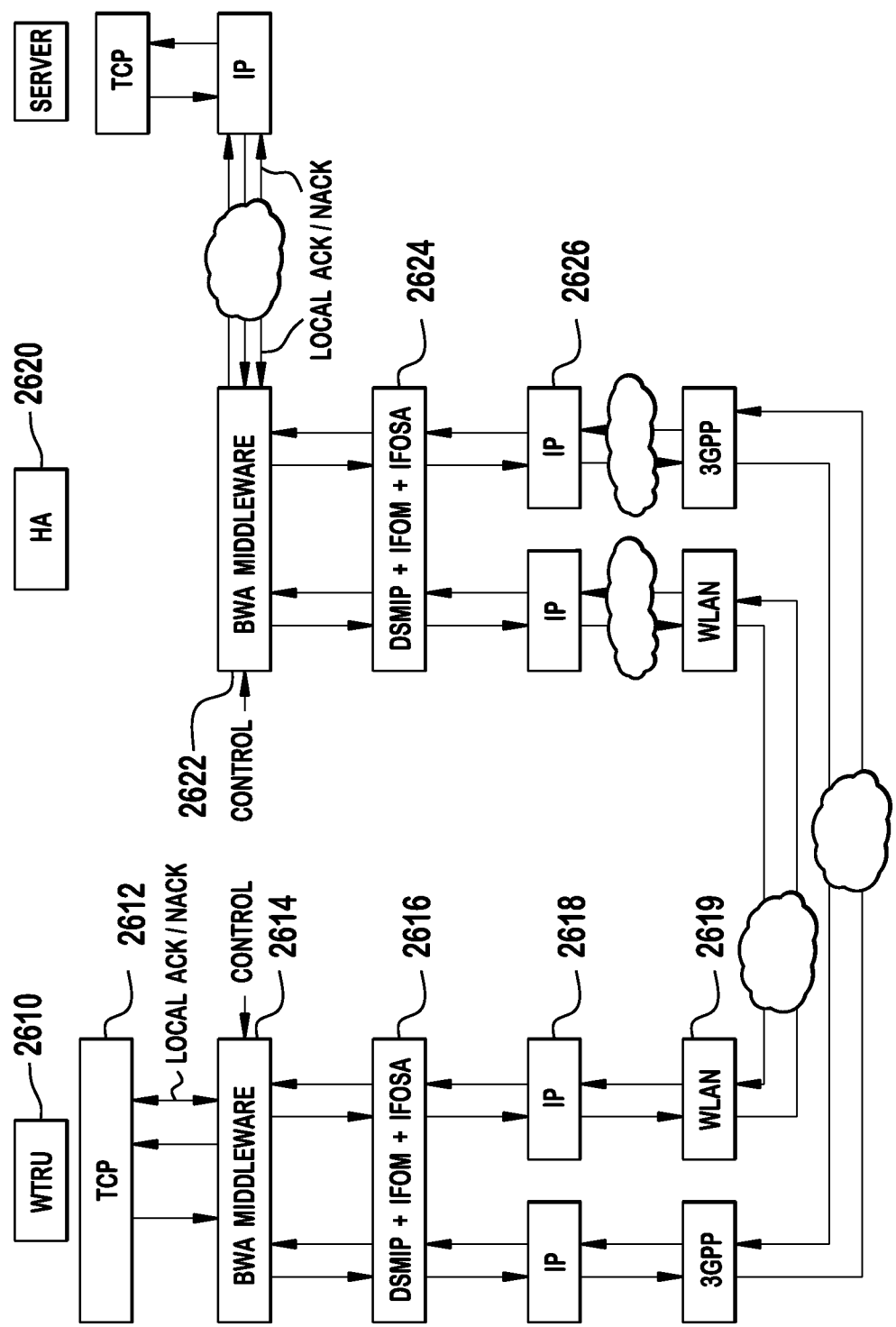
FIG. 26 shows an example bandwidth aggregation (BWA) middleware architecture in accordance with one embodiment.

In another embodiment, a bandwidth aggregation middleware may be used between the TCP and IP layers. FIG. 26 shows an example BWA middleware architecture in accordance with one embodiment. A WTRU 2610 includes a TCP layer 2612, a BWA middleware 2614, a DSMIP layer 2616, an IP layer 2618, and multiple L2 and L1 layers 2619 specific to radio access technologies. An HA 2620 includes a BWA middleware 2622, a DSMIP layer 2624 and an IP layer 2626. The DSMIP layer 2616, 2624 at the WTRU 2610 and the HA 2620 is enhanced to support IP flow splitting and aggregation (IFOSA) for associating one IP flow with two or more interfaces.

The BWA middleware layer 2614, 2622 may serve two distinct functions, depending on whether the packets are going in the TCP to IP direction or IP to TCP direction. Some of these enhancements, such as buffering etc, are also applicable for other types of traffic such as UDP, multicast, etc. The functions for the WTRU may be identical on the HA side.

For the TCP packets going towards the IP interfaces in the WTRU, the BWA middleware 2614, 2622 may split the packets in accordance with the policy and distribute them across multiple IP interfaces.

On the receiver side, the BWA middleware 2614, 2622 may extract the TCP packets from each of the IP packets that have been received across multiple IP interfaces and buffer them before combining the packet streams and sending towards the TCP layer. The BWA middleware 2614, 2622 may examine the TCP sequence numbers and attempt to order them before forwarding to the TCP layer. The buffer size may be properly chosen so that the extra latency introduced by the buffer may be offset by the fact that the re-ordering burden of the TCP layer is reduced. In addition, out-of-order delivery of the TCP packets may trigger retransmission requests by the TCP layer. The BWA middleware 2614, 2622 may buffer packets on the sender side. A buffer and ACK spoofing function may be used on the sender side to deal with timeout.

On the sender side, the TCP maintains a timer for each sent packet. If the TCP does not receive any response (either normal or duplicated ACK) within a certain amount of time, the timeout congestion event is triggered. In order to prevent such event from happening, the BWA middleware 2614, 2622 may maintain a counterpart timer that has the same parameters (start time, period, packet number, etc.) as in the TCP so that the buffer and ACK spoofing function of the BWA middleware may 2614, 2622 know the timeout time of each packet. When the timer is about to expire in the TCP, the BWA middleware 2614, 2622 may recognize it by using the counterpart timer. If at least one of the channels is in good condition, the BWA middleware 2614, 2622 may cancel the timer by sending a fake ACK to the TCP, and may pick out the same packet from its buffer and send it to the receiver through one of the non-congested channels. In this way, the BWA middleware 2614, 2622 may minimize the unnecessary throughput degradations. If, in a certain situation, the sender does not get the ACK, which may mean that all channels are bad, the BWA middleware 2614, 2622 may notify it to the TCP layer.

On the receiver side, when one or more of the aggregated links is slower compared to the others, the TCP layer may generate false duplicated ACKs. The BWA middleware 2614, 2622 may intercept the duplicated ACK messages and keep them in the buffer. If the corresponding packet is received after some delay along the slower link, the BWA middleware 2614, 2622 may suppress the duplicated ACKs and forward the lately-received packet towards the TCP layer, and forward an ACK to the sender side. This mechanism improves the performance of TCP congestion control algorithm over aggregated multiple links.

It should be noted that the ACK spoofing/suppression mechanism disclosed above may be based on the assumption that the BWA middleware 2614, 2622 has sufficient knowledge of the channel condition. Such knowledge may be obtained by, for example, packet counting on the IP layer.

In another embodiment, the TCP layer, when informed about the availability of the aggregated links, may turn off the feature that triggers the fast recovery mode after receiving predetermined number of consecutive duplicate ACKs. The TCP layer may be informed either by the application, layer 3, or by the other side of the connection via a new protocol option. The new protocol option may be sent with an ACK or with a PSH flag.

Either side detects that the TCP stream is aggregated because packets come through two or more different interfaces. The layer that has detected it (i.e., application, L3, TCP, etc.) may inform the TCP by invoking an application programming interface (API). The TCP may issue an option that informs the other side of the connection. Both sides may disable the above mentioned trigger of the fast recovery mode. In a similar way, the TCP layer may turn back on the fast recovery scheme when informed that the aggregated link is no longer available.

An access network discovery and selection function (ANDSF) management object (MO) is used to manage Inter-System Mobility Policy (ISMP) and Inter-System Routing Policy (ISRP) as well as access network discovery information stored in a WTRU supporting provisioning of such information from an ANDSF. The ANDSF may initiate the provision of information to the WTRU. The WTRU configured for IP flow mobility, multi access PDN connectivity (MAP-CON), or non-seamless WLAN offload or any combination of these capabilities may initiate the provision of information from the ANDSF, using a client-initiated session containing a generic alert.

The ISRP indicates how to distribute traffic among available accesses when the WTRU is capable to connect to the Evolved Packet Core (EPC) through multiple accesses (i.e., the WTRU is configured for IFOM, MAPCON, non-seamless WLAN offload or any combination of these capabilities). The ISRP information includes a set of one or more ISRP rules. Each ISRP rule contains an indication on traffic distribution for WTRUs that are configured for IFOM, MAPCON or non-seamless WLAN offload.

An ISRP rule may contain one or more flow distribution containers. The flow distribution containers are called ForFlowBased for IFOM service, ForServiceBased for MAPCON, and ForNonSeamlessOffload for Non-seamless WLAN offload. More containers are defined for Data Identification in ANDSF (DIDA) including ForThroughputBased, ForAppldBased, ForFQDNBased, ForContentTypeBased, and ForContentSizeBased.

A flow distribution container may have one or more flow distribution rules. A flow distribution rule has a number of results (e.g., preferred access technology and restricted access technology) defined in the RoutingRule node to be used whenever the flow distribution rule is applied.

Figure 27:
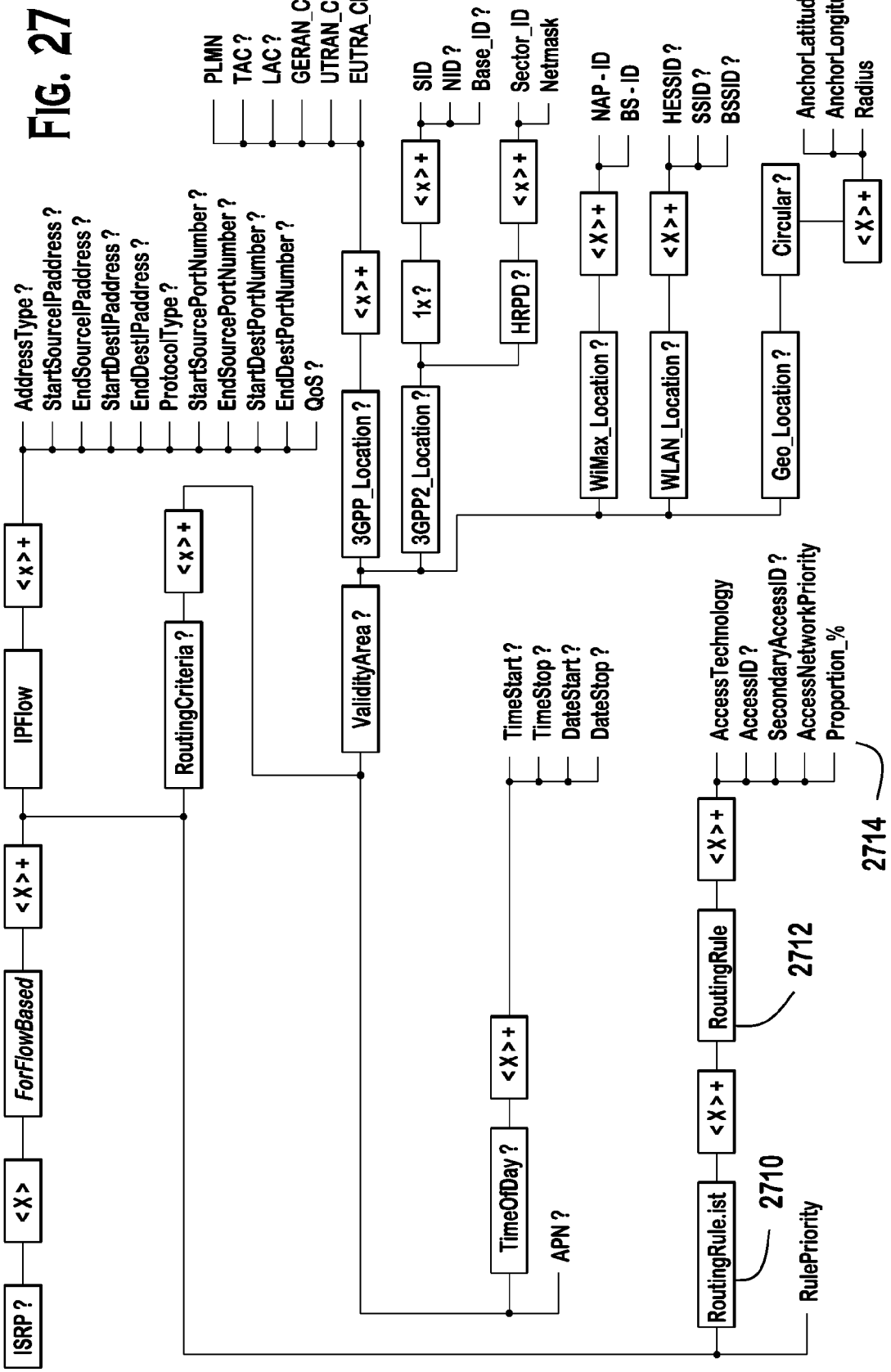
FIG. 27 shows an example ForFlowBased inter-system routing policy (ISRP) container including access technology and corresponding flow distribution proportion to support bandwidth aggregation in accordance with one embodiment.

There is currently no way for the ANDSF server to configure L3 aggregation rules on the WTRU. In one embodiment, to support configuration of bandwidth aggregation rules and policies on the WTRU, a list of access technologies with corresponding distribution proportions may be added to the ISRP. FIG. 27 shows an example ForFlowBased ISRP container including access technology and corresponding flow distribution proportion to support bandwidth aggregation in accordance with one embodiment. It should be noted that FIG. 27 is provided as an example and the embodiment is applicable to any ISRP container.

As shown in FIG. 27, a RoutingRuleList 2710 containing at least one RoutingRule 2712 is added to the ISRP container (ForFlowBased container in this example). The RoutingRule 2712 indicates the access technology for a flow distribution rule. The distribution proportion for the corresponding access technology is specified by a Proportion_% field 2714. As an example, in FIG. 27, the ForFlowBased container may be used to specify the aggregation rules for a specific flow, (e.g., FLOW_A with 40% traffic on 3GPP and 60% on WiFi). The sum of Proportion_% values may be equal to 100. If a single RoutingRule is specified in the RoutingRuleList, the Proportion_% field may be set to 100. The distribution proportions may be specified using percentage or packets counts (e.g., for every 2 packets sent on IFx send 3 on IFy), or any other means.

The aggregation rule is applicable to any aggregation layer. For example, the MAC layer may use the rule, and the logical interface may use the rule as an input for its packet scheduler.

The ANDSF server may push the ISRP to the WTRU or the WTRU may query the ANDSF server. The WTRU may send information to the ADSF server or the ANDSF server may query the WTRU. This may enable network-based or mobile-based aggregation.

In another embodiment, during network access authentication, the WTRU may provide an explicit indication for the supported mobility protocol, for example, by using an attribute in the Extensible Authentication Protocol-Authentication Key Agreement (EAP-AKA) or EAP-AKA' payload.

Support of aggregation may be added to the AT_IPMS_IND attribute with the type and supported method, when applicable. For example, aggregation support at layer 3 with learning method may be specified.

For example, the following aggregation types and methods may be specified: aggregation type (L4, L3, L2, none), aggregation method (e.g., for L4=multipath TCP (MPTCP), for L3=Learning or Signaling). The 3GPP Authentication, Authorization, and Accounting (AAA) server may indicate the selected mobility protocol to the WTRU. With the support of aggregation, the AAA server may indicate the selected type of aggregation and the corresponding method.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for bandwidth aggregation for an Internet protocol (IP) flow, the method comprising:
   a sender splitting IP packets on a single IP flow;
   the sender transmitting the IP packets on the single IP flow to a receiver via at least two interfaces; and
   the sender receiving access network discovery and selection function (ANDSF) Inter-System Routing Policy (ISRP) including a routing rule for IP flow distribution.

2. The method of claim 1 wherein an anchor node of the IP packets is located in a mobile core network, at a network edge, in an access network, or in Internet external to a mobile core network.

3. The method of claim 1 wherein the sender splits and transmits the packets on multiple interfaces without sending any signaling to the receiver.

4. The method of claim 1 further comprising:
   the sender transmitting information to the receiver for configuring distribution of the IP packets over multiple interfaces.

5. The method of claim 4 wherein the information is carried on at least one of a binding update message, a binding acknowledgement message, or a binding refresh request message.

6. The method of claim 1 wherein the IP packets are split and transmitted by a logical interface that sits between an IP layer and a layer 2.

7. The method of claim 6 wherein the logical interface keeps track of incoming and outgoing IP packets on all interfaces and selects an interface for outgoing IP packets based on a configured rule.

8. The method of claim 6 wherein the logical interface uses distribution of incoming IP packets over multiple interfaces and/or a weight factor to determine distribution for outgoing IP packets over the interfaces.

9. The method of claim 6 wherein the logical interface uses a timer to determine whether IP flow mobility or bandwidth aggregation is implemented, wherein the timer is triggered on a condition that an IP packet arrives over a new interface.

10. The method of claim 6 further comprising:
    the sender transmitting information to the receiver for configuring distribution of the IP packets over multiple interfaces, wherein the information is carried on at least one of a flow mobility initiate (FMI) message, a router advertisement message, a router solicitation message, or a non-access stratum (NAS) message.

11. The method of claim 1 wherein the IP packets are split by a bandwidth aggregation (BWA) middleware located between a transmission control protocol (TCP) layer and an Internet protocol (IP) layer.

12. The method of claim 11 wherein the BWA middleware extracts TCP packets from the IP packets that have been received across multiple interfaces and buffer the TCP packets before sending towards the TCP layer.

13. The method of claim 11 wherein the BWA middleware maintains a timer that has same parameters as in the TCP layer for each TCP packet, and when the timer is about to expire and if at least one channel is not congested, the BWA middleware sends a fake acknowledgement (ACK) to the TCP layer and picks out the TCP packet from a buffer and sends it to the receiver through one of non-congested channels.

14. The method of claim 11 wherein the BWA middleware intercepts duplicated acknowledgement (ACK) messages from the TCP layer and keeps them in a buffer, and if a corresponding TCP packet is received along a slower link, the BWA middleware suppresses the duplicated ACK messages and forwards the lately-received TCP packet towards the TCP layer, and forward an ACK to the sender.

15. An apparatus for bandwidth aggregation for an Internet protocol (IP) flow, the apparatus comprising:
    a processor configured to split IP packets on a single IP flow, and transmit the IP packets on the single IP flow to a receiver via at least two interfaces, wherein the processor receives access network discovery and selection function (ANDSF) Inter-System Routing Policy (ISRP) including a routing rule for IP flow distribution.

16. The apparatus of claim 15 wherein the processor is configured to send information to the receiver for configuring distribution of the IP packets over multiple interfaces, wherein the information is carried on at least one of a binding update message, a binding acknowledgement message, or a binding refresh request message.

17. The apparatus of claim 15 further comprising:
    a logical interface configured to split and transmit the IP packets over multiple interfaces, wherein the logical interface sits between an IP layer and a layer 2.

18. The apparatus of claim 17 wherein the logical interface is configured to keep track of incoming and outgoing IP packets on all interfaces and select an interface for outgoing IP packets based on a configured rule.

19. The apparatus of claim 17 wherein the logical interface is configured to use distribution of incoming IP packets over multiple interfaces and/or a weight factor to determine distribution for outgoing IP packets over the interfaces.

20. The apparatus of claim 17 wherein the logical interface is configured to use a timer to determine whether IP flow mobility or bandwidth aggregation is implemented, wherein the timer is triggered on a condition that an IP packet arrives over a new interface.

21. A method for bandwidth aggregation for an Internet protocol (IP) flow, the method comprising:

a sender splitting IP packets on a single IP flow; and the sender transmitting the IP packets on the single IP flow to a receiver via at least two interfaces;

wherein the IP packets are split by a bandwidth aggregation (BWA) middleware located between a transmission control protocol (TCP) layer and an Internet protocol (IP) layer.

22. The method of claim 21 wherein the BWA middleware extracts TCP packets from the IP packets that have been received across multiple interfaces and buffer the TCP packets before sending towards the TCP layer.

23. The method of claim 21 wherein the BWA middleware maintains a timer that has same parameters as in the TCP layer for each TCP packet, and when the timer is about to expire and if at least one channel is not congested, the BWA middleware sends a fake acknowledgement (ACK) to the TCP layer and picks out the TCP packet from a buffer and sends it to the receiver through one of non-congested channels.

24. The method of claim 21 wherein the BWA middleware intercepts duplicated acknowledgement (ACK) messages from the TCP layer and keeps them in a buffer, and if a corresponding TCP packet is received along a slower link, the BWA middleware suppresses the duplicated ACK messages and forwards the lately-received TCP packet towards the TCP layer, and forward an ACK to the sender.

* * * * *